United States Patent
Jogetsu et al.

(10) Patent No.: US 9,167,158 B2
(45) Date of Patent: Oct. 20, 2015

(54) IMAGING DEVICE, AND IMAGING METHOD

(71) Applicant: FUJIFILM Corporation, Tokyo (JP)

(72) Inventors: Tadashi Jogetsu, Saitama (JP); Takeshi Okubo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/508,156

(22) Filed: Oct. 7, 2014

(65) Prior Publication Data

US 2015/0022706 A1    Jan. 22, 2015

Related U.S. Application Data

(63) Continuation of application No. PCT/JP2012/083225, filed on Dec. 21, 2012.

(30) Foreign Application Priority Data

Apr. 10, 2012    (JP) .................................. 2012-089494

(51) Int. Cl.
*H04N 5/222* (2006.01)
*H04N 5/225* (2006.01)
*H04N 5/232* (2006.01)
*G03B 13/06* (2006.01)
*G03B 17/20* (2006.01)

(52) U.S. Cl.
CPC ............ *H04N 5/23245* (2013.01); *G03B 13/06* (2013.01); *G03B 17/20* (2013.01); *H04N 5/2251* (2013.01); *H04N 5/2252* (2013.01); *H04N 5/2254* (2013.01); *H04N 5/23216* (2013.01); *H04N 5/23293* (2013.01); *H04N 5/23296* (2013.01)

(58) Field of Classification Search
CPC ................................................. H04N 5/23293
USPC ...................................... 348/333.09, 341, 373
See application file for complete search history.

(56) References Cited

U.S. PATENT DOCUMENTS 5,161,025 A    11/1992    Nakao

FOREIGN PATENT DOCUMENTS

| JP | 3-292067 A | 12/1991 |
|---|---|---|
| JP | 2009-200552 A | 9/2009 |
| JP | 2012-63643 A | 3/2012 |

OTHER PUBLICATIONS

FUJIFILM Corporation, "FINEPIX X100 Software usage guide", Jan. 30, 2012, p. 30, <URL : http://fujifilm.jp/support/digitalcamera/download/pack/pdf/ff_finepixx100_mn_j103.pdf>.
International Search Report for PCT/JP2012/083225 mailed on Mar. 12, 2013.
Written Opinion of the International Searching Authority for PCT/JP2012/083225 mailed on Mar. 12, 2013.

*Primary Examiner* — Roberto Velez
*Assistant Examiner* — Stephen Coleman
(74) *Attorney, Agent, or Firm* — Birch, Stewart, Kolasch & Birch, LLP

(57) ABSTRACT

According to the preset invention, an optical viewfinder state in which an optical image of a photographic subject can be observed at an eyepiece part of a finder and an electronic viewfinder state in which a captured image of the photographic subject can be observed at the eyepiece part of the finder are switched when a first operation is carried out with a finger by an operation device, and a magnification (optical magnification) of a first finder optical system of the finder is changed when a second operation is carried out with a finger by the operation device in the optical viewfinder state. Thus, a user can perform photographing while freely observing the photographic subject by an operation of switching the finder (first operation) and an operation of changing the optical magnification of the finder (second operation) while looking through the finder.

15 Claims, 16 Drawing Sheets

IMAGING DEVICE, AND IMAGING METHOD

CROSS-REFERENCE TO RELATED APPLICATIONS

This application is a Continuation of PCT International Application No. PCT/JP2012/083225 filed on Dec. 21, 2012, which claims priority under 35 U.S.C. §119(a) to Japanese Patent Application No. 2012-89494 filed on Apr. 10, 2012. Each of the above application(s) is hereby expressly incorporated by reference, in its entirety, into the present application.

BACKGROUND OF THE INVENTION

1. Field of the Invention

The present invention relates to an imaging device and an imaging method, and in particular, relates to an imaging device and an imaging method that make it possible to freely perform a switching operation for determining which of an optical image of a photographic subject and a captured image of the photographic subject is to be led to an eyepiece part of a finder and a switching operation of an optical magnification of the finder while looking through the eyepiece part.

2. Description of the Related Art

PTL 1 (Japanese Patent Application Laid-Open No. 3-292067) discloses a finder capable of leading an optical image of an optical viewfinder (OVF) and a display image of an electronic viewfinder (EVF) to an eyepiece part.

Also, as a lens interchangeable type camera for which an imaging lens is freely attachable and detachable to/from a camera body, a mirrorless single-lens camera from which a reflection mirror is omitted is spreading.

SUMMARY OF THE INVENTION

However, it is not easy to freely perform a switching operation of an optical viewfinder (also called "OVF" hereinafter) and an electronic viewfinder (also called "EVF" hereinafter) and a magnification varying operation of the optical viewfinder (OVF) while looking through an eyepiece part.

In a finder (hybrid viewfinder) capable of leading an optical image of a photographic subject of the OVF and a captured image of the photographic subject of the EVF to the eyepiece part, an operation of switching the OVF and the EVF (finder switching operation) is performed while looking through the eyepiece part. However, when the EVF is switched to the OVF, it is difficult to perform an operation of changing an optical magnification of the OVF (finder magnification varying operation) while looking through the eyepiece part. It is because the operation has to be performed while not viewing an operation device for changing a finder magnification, that is different from an operation device for the finder switching operation. Therefore, a user releases an eye from the eyepiece part and performs the finder magnification varying operation.

The present invention is implemented in consideration of such circumstances and an object is to provide an imaging device and an imaging method that make it possible to freely perform a switching operation for determining which of an optical image of a photographic subject and a captured image of the photographic subject is to be led to an eyepiece part of a finder and a switching operation of an optical magnification of the finder while looking through the eyepiece part.

To achieve the object, the present invention provides an imaging device including: an imaging element that images a photographic subject through an imaging lens; a finder including an eyepiece part, a first finder optical system that leads an optical image of the photographic subject to the eyepiece part through a route different from the imaging lens, a display part that can display a captured image of the photographic subject obtained by performing imaging in the imaging element, and a second finder optical system that leads the captured image of the photographic subject displayed at the display part to the eyepiece part; an operation device that can be operated with a finger; a finder switching control device that switches between leading of the optical image of the photographic subject through the first finder optical system of the finder to the eyepiece part of the finder, and display of the captured image of the photographic subject at the display part of the finder and leading of the captured image of the photographic subject through the second finder optical system of the finder to the eyepiece part of the finder; a finder variable magnification control device that changes a magnification of the first finder optical system of the finder; and a control device that switches between leading of the optical image of the photographic subject and leading of the captured image of the photographic subject to the eyepiece part of the finder by the finder switching control device when a first operation is performed by the operation device, and makes the finder variable magnification control device change the magnification of the first finder optical system of the finder when a second operation different from the first operation is performed by the operation device in an optical viewfinder state in which the optical image of the photographic subject is led to the eyepiece part of the finder.

Accordingly, since the optical viewfinder state in which the optical image of the photographic subject can be observed by the eyepiece part of the finder and an electronic viewfinder state in which the captured image of the photographic subject can be observed by the eyepiece part of the finder are switched when the first operation is performed with a finger by the operation device and the magnification (optical magnification) of the first finder optical system of the finder is changed when the second operation is performed with a finger by the operation device in the optical viewfinder state, a user can perform photographing while freely observing the photographic subject by the operation of switching the finder (first operation) and the operation of changing the optical magnification of the finder (second operation) while looking through the finder.

In one embodiment, a lens mounting part to/from which the imaging lens is attachable and detachable, a mounting detection device that detects whether or not the imaging lens is mounted on the lens mounting part, and a lens information acquisition device that acquires information on the imaging lens from the imaging lens when mounting of the imaging lens is detected by the mounting detection device are provided, and the control device sets the magnification of the first finder optical system of the finder by the finder variable magnification control device on the basis of the information on the imaging lens, which is acquired from the imaging lens by the lens information acquisition device. That is, since the optical magnification of the finder (the magnification of the first finder optical system) is automatically set at the magnification suitable for the mounted imaging lens when the imaging lens (interchangeable lens) is mounted on the lens mounting part, the user can observe the optical image of the photographic subject at the optical magnification suitable for the mounted imaging lens by looking through the eyepiece part of the finder without performing a finder operation when the lens is mounted.

In one embodiment, the control device changes the magnification of the captured image of the photographic subject displayed at the display part of the finder when the second operation is performed by the operation device in the electronic viewfinder state in which the captured image of the photographic subject is led to the eyepiece part of the finder. That is, by performing the second operation in the electronic viewfinder state, an electronic magnification of the finder can be freely changed and the captured image of the photographic subject can be observed.

In one embodiment, there are a photographing mode of recording the captured image of the photographic subject in a recording medium, and a reproducing mode of reproducing and displaying the captured image of the photographic subject, which is recorded in the recording medium, and the control device sets the magnification of the first finder optical system of the finder at the magnification according to a focal distance of the imaging lens on the basis of the information on the imaging lens, which is acquired from the imaging lens, when power of the imaging device is turned on, and sets the magnification of the first finder optical system of the finder at the magnification set in the photographing mode before return when the photographing mode returns from the reproducing mode. That is, while the optical magnification of the finder can be a default value suitable for the imaging lens since a photographing condition is often changed from the time of previous photographing when the power is turned on, it is preferable that the optical magnification of the finder is automatically switched to the same magnification as that for the time of the previous photographing for the user since the photographing condition is often the same as the time of the previous photographing when the photographing mode returns from the reproducing mode.

In one embodiment, the control device has a function of switching from the photographing mode to a power saving sleep mode, and when the photographing mode returns from the sleep mode, sets the magnification of the first finder optical system to the magnification set in the photographing mode before the return. That is, while the optical magnification of the finder can be generally the default value suitable for the imaging lens since the photographing condition is often changed from the time of the previous photographing when the power is turned on, it is preferable that the optical magnification of the finder is automatically switched to the same magnification as that for the time of the previous photographing for the user since the photographing condition is often the same as the time of the previous photographing when the photographing mode returns from the sleep mode.

In one embodiment, there are a photographing mode of recording the captured image of the photographic subject in a recording medium, and a reproducing mode of reproducing and displaying the captured image of the photographic subject, which is recorded in the recording medium, and when non-mounting of the imaging lens is detected in the photographing mode, the control device sets the finder to the optical viewfinder state, and keeps the optical viewfinder state even when the first operation is performed in the operation device.

In one embodiment, when the first operation is performed in the state that the non-mounting of the imaging lens is detected, the control device makes the display part of the finder display information indicating that the captured image of the photographic subject cannot be displayed, thereby superimposing the information displayed at the display part of the finder on the optical image of the photographic subject through the second finder optical system of the finder.

In one embodiment, the operation device includes a movable part that moves on the same track between a first position and a second position different from the first position by both of the first operation and the second operation. That is, just by moving the movable part of the operation device with a finger on the same track between the first position and the second position, the first operation (finder switching operation) and the second operation (finder magnification varying operation) can be easily performed while looking through the eyepiece part of the finder.

In one embodiment, the movable part of the operation device is configured to move from the first position to the second position accompanying the operation and return from the second position to the first position when the operation is stopped, and the control device determines whether it is the first operation or the second operation on the basis of a length of the time during which the movable part of the operation device is positioned at the second position. That is, the finder can be switched quickly by operating the movable part of the operation device short with a finger, and the optical magnification of the finder can be changed while observing the optical image of the photographic subject by operating the movable part of the operation device long with a finger. Also, in the present embodiment, the first operation may be determined when the time during which the operation device is positioned at the second position of the movable part is shorter than a threshold, and the second operation may be determined when the time is equal to or longer than the threshold.

In one embodiment, the movable part of the operation device is configured to move from the first position to the second position accompanying the operation and return from the second position to the first position when the operation is stopped, and the control device determines that it is the first operation when an operation of repeatedly positioning the movable part of the operation device at the second position at a time interval shorter than a prescribed time interval is performed for a first number of times, and determines that it is the second operation when the operation of repeatedly positioning the operation device at the second position at the time interval shorter than the prescribed time interval is performed for a number of times different from the first number of times. That is, depending on the number of times of operating the movable part of the operation device with a finger, the finder can be switched, and the optical magnification of the finder can be changed while observing the optical image of the photographic subject. Also, in the present embodiment, the "prescribed time interval" may be the time interval determined beforehand.

In one embodiment, the operation device and a light emitting part are arranged on a surface facing the photographic subject of the imaging device, and the operation device is moved in a direction of separating from a position of the light emitting part by the first operation and the second operation. That is, the light emitting part can be prevented from being covered with a finger during photographing.

In one embodiment, the operation device and a microphone are arranged on the surface facing the photographic subject of the imaging device, and the operation device is moved in a direction of separating from a position of the microphone by the first operation and the second operation. That is, the microphone can be prevented from being covered with a finger during photographing.

In one embodiment, a photographing instruction input part that receives input of a photographing instruction is provided, and the movable part of the operation device is arranged at such a position that, while the photographing instruction input part is being touched with a pointing finger, the movable part of the operation device can be operated with a middle finger of the same hand as the pointing finger. That is, the photographing instruction, the finder switching operation and the finder magnification varying operation can be performed with one hand.

In one embodiment, a holding part to be held with one hand is provided, and the operation device is provided at a position so as to be operated with a finger of the hand holding the holding part. That is, while holding the imaging device with one hand, the finder switching operation and the finder magnification varying operation can be performed.

Also, the present invention provides an imaging method that uses an imaging element that images a photographic subject through an imaging lens, a finder including an eyepiece part, a first finder optical system that leads an optical image of the photographic subject to the eyepiece part through a route different from the imaging lens, a display part that can display a captured image of the photographic subject obtained by performing imaging in the imaging element, and a second finder optical system that leads the captured image of the photographic subject displayed at the display part to the eyepiece part, an operation device that can be operated with a finger, a finder switching control device that switches between leading of the optical image of the photographic subject through the first finder optical system of the finder to the eyepiece part of the finder, and display of the captured image of the photographic subject at the display part of the finder and leading of the captured image of the photographic subject through the second finder optical system of the finder to the eyepiece part of the finder, and a finder variable magnification control device that changes a magnification of the first finder optical system of the finder, switches between leading of the optical image of the photographic subject and leading of the captured image of the photographic subject to the eyepiece part of the finder by the finder switching control device when a first operation is performed by the operation device, and makes the finder variable magnification control device change the magnification of the first finder optical system of the finder when a second operation different from the first operation is performed by the operation device in an optical viewfinder state in which the optical image of the photographic subject is led to the eyepiece part of the finder. According to the imaging method, similarly to the imaging device of the above-described embodiment, photographing can be performed while freely observing the photographic subject by the operation of switching the finder (first operation) and the operation of changing the optical magnification of the finder (second operation) while looking through the finder.

Advantageous Effects of Invention

The present invention makes it possible to freely perform a switching operation for determining which of an optical image of a photographic subject and a captured image of the photographic subject is to be led to an eyepiece part of a finder and a switching operation of an optical magnification of the finder while looking through the eyepiece part.

BRIEF DESCRIPTION OF THE DRAWINGS

FIG. 12 is a flowchart illustrating a flow of finder control processing when power of the imaging device 100 is on.

DETAILED DESCRIPTION OF THE PREFERRED EMBODIMENTS

Hereinafter, a mode for carrying out the present invention is described in detail according to appended drawings.

Figure 1:
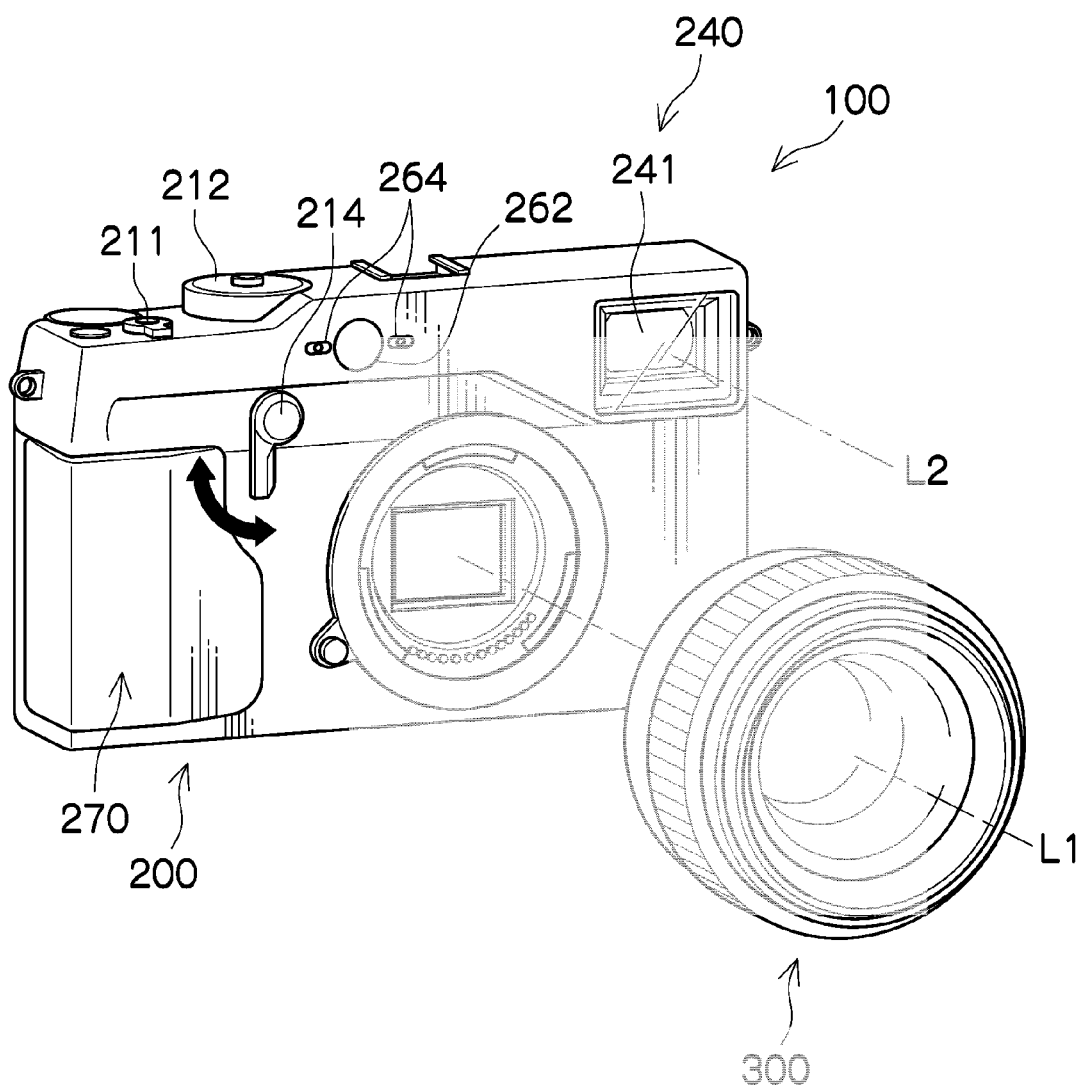
FIG. 1 is a front perspective view of an imaging device 100 according to one embodiment of the present invention.
Figure 2:
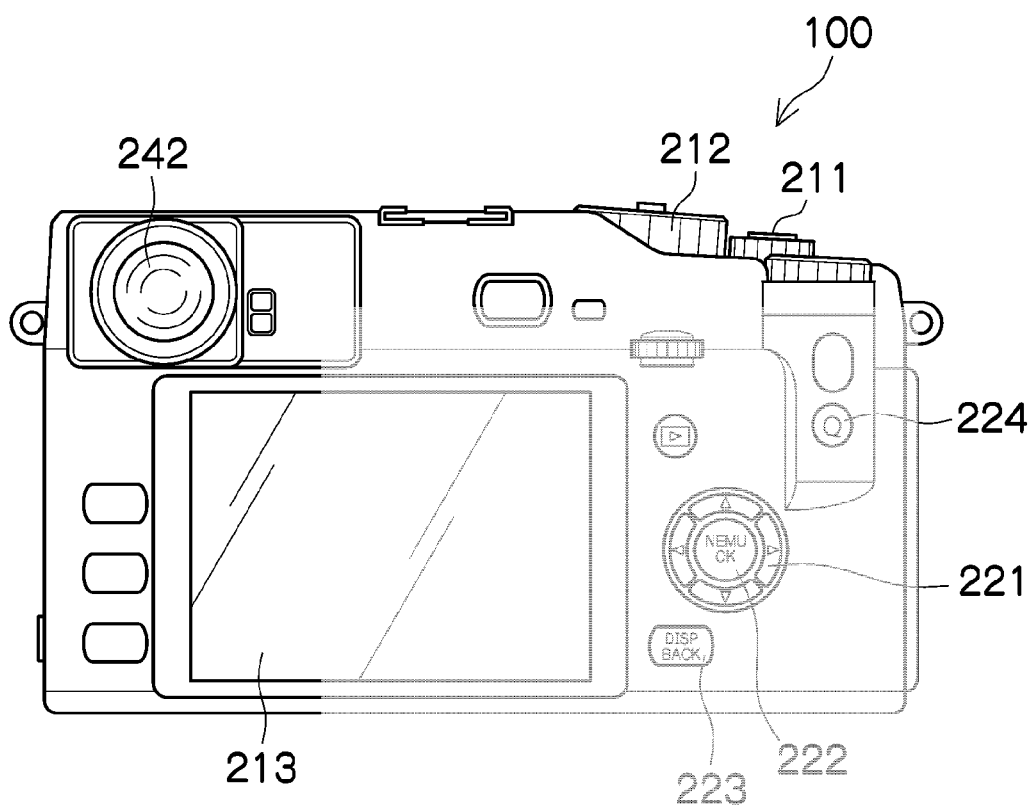
FIG. 2 is a rear view of the imaging device 100.

FIG. 1 is a front perspective view of an imaging device 100 which is a lens interchangeable type camera according to one embodiment of the present invention, and FIG. 2 is a rear view of the imaging device 100. The imaging device 100 is constituted of a camera body 200, and an interchangeable lens 300 interchangeably mounted on the camera body 200. The camera body 200 and the interchangeable lens 300 are interchangeably mounted by connecting a mount 256 provided on the camera body 200 and a mount 346 on the side of the interchangeable lens 300 corresponding to the mount 256 on the side of the camera body 200.

On a front surface of the camera body 200, other than the mount 256, a finder window 241 of a finder 240 (described in detail later), a finder operation lever 214, a light emitting part 262, a microphone 264 and the like are provided. Also, an optical axis L2 of the finder 240 is the optical axis different from an optical axis L1 of the interchangeable lens 300. On an upper surface of the camera body 200, a release button 211 and a dial 212 are provided mainly.

The release button 211 is an operation device for inputting an instruction of imaging start, and is constituted of a two-stage stroke type switch composed of so-called "half depression" and "full depression". In a digital camera, a signal of S1 ON is outputted by the half depression of a release switch, a signal of S2 ON is outputted by the full depression of further depression from the half depression, photographing preparation processing such as automatic focus control (AF processing) and automatic exposure control (AE processing) is executed when the S1 ON signal is outputted, and photographing processing is executed when the S2 ON signal is outputted. The release switch is not limited to the form of the two-stage stroke type switch composed of the half depression and the full depression, the signal of S1 ON and the signal of S2 ON may be outputted by one operation, and individual switches may be provided respectively to output the signal of S1 ON and the signal of S2 ON. Also, in the form of instructing the operation by a touch panel or the like, an operation instruction may be outputted by touching an area corresponding to the operation instruction displayed on a screen of the touch panel as the operation device, and the form of the operation device is not limited to them as long as the photographing preparation processing and the photographing processing are instructed in the present invention. Also, the photographing preparation processing and the photographing processing may be continuously executed by one operation instruction to the operation device.

On a back surface of the camera body 200, mainly, an eyepiece part 242 of the finder 240, a monitor 213, a MENU/OK key 222, a cross key 221 (direction instruction button), a BACK key 223, and a Q button 224 are provided.

The MENU/OK key 222 is an operation key having both of a function as a menu button for commanding display of a menu on a screen of the monitor 213 and a function as an OK button for commanding establishment and execution of selected contents or the like. The cross key 221 is an operation part that for inputting instructions of four upper, lower, left and right directions, and functions as a button (cursor movement operation device) for selecting an item from a menu screen and instructing selection of various kinds of setting items from the individual menus. Also, upper/lower keys of the cross key 221 function as a zoom switch during photographing or a reproduction zoom switch during a reproducing mode, and left/right keys function as a frame feed (forward direction/reverse direction feed) button during the reproducing mode. The BACK key 223 is used when deleting a desired object such as a selected item, canceling instruction contents or returning to a preceding operation state or the like. The Q button 224 functions as a button for commanding display of a desired menu screen on the screen of the monitor 213.

Figure 3:
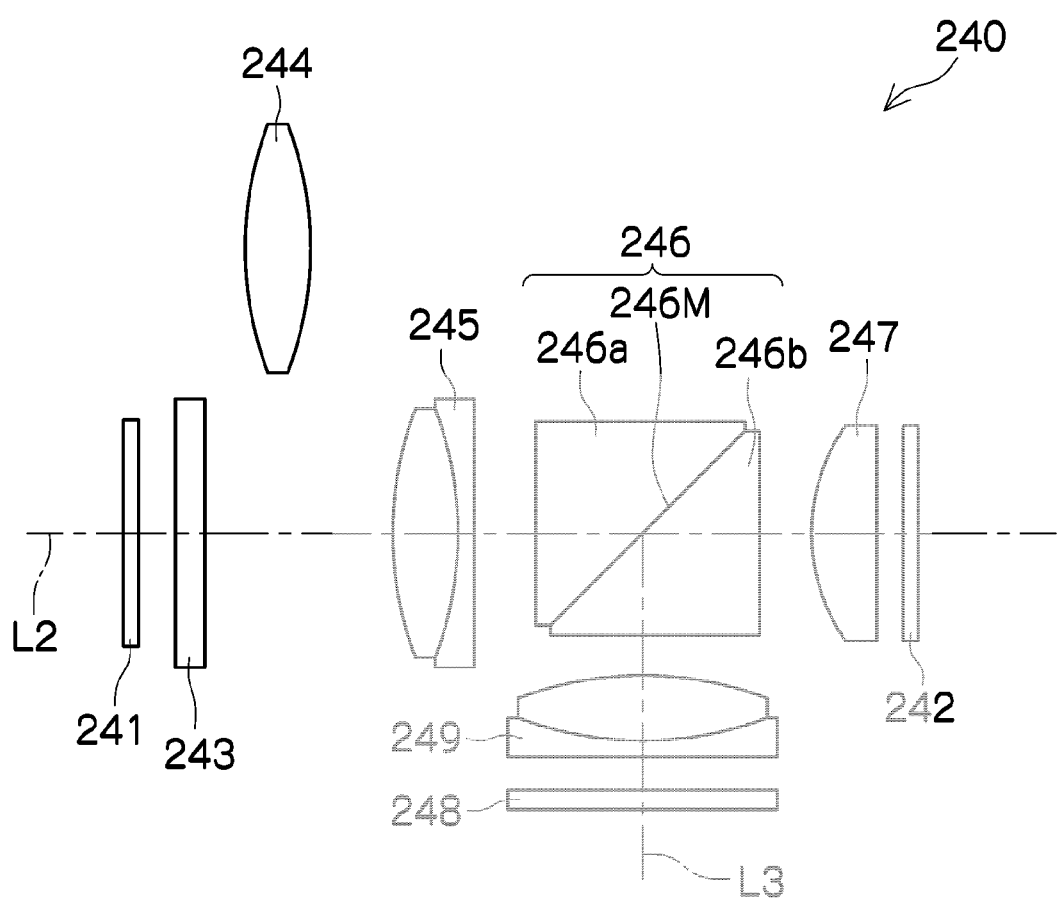
FIG. 3 is a main section configuration diagram of a finder, and illustrates the state that a finder variable magnification lens is withdrawn from an optical path L2.
Figure 4:
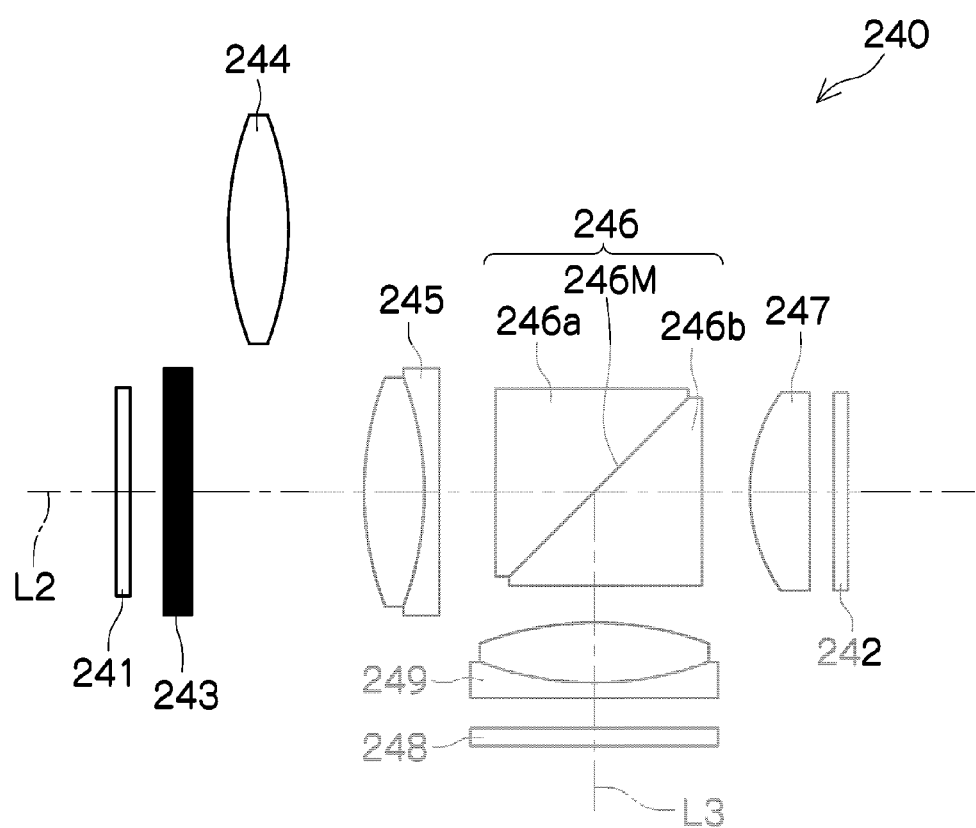
FIG. 4 is a main section configuration diagram of the finder, and illustrates the case that a liquid crystal shutter is in a light shielding state.
Figure 5:
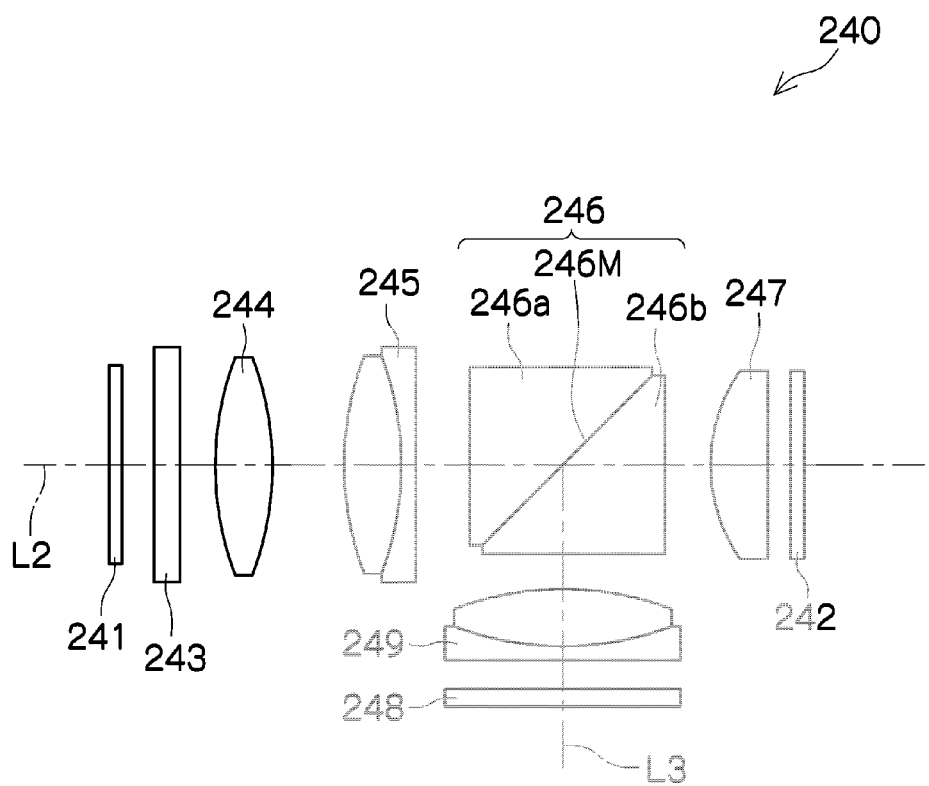
FIG. 5 is a main section configuration diagram of the finder, and illustrates the state that the finder variable magnification lens is made to enter the optical path L2.

FIGS. 3-5 are schematic diagrams illustrating an optical system of the finder 240. FIG. 3 and FIG. 5 illustrate the state that an optical image is visible, and FIG. 4 illustrates the state that an electronic image is visible.

The finder 240 is mainly constituted of the finder window 241, the eyepiece part 242, a liquid crystal shutter 243, a finder variable magnification lens 244, an objective lens 245, a prism 246, an eyepiece lens 247, a liquid crystal plate 248, and a lens 249 for the liquid crystal plate.

The finder window 241, the eyepiece part 242, the liquid crystal shutter 243, the objective lens 245, the prism 246, and the eyepiece lens 247 are arranged on the optical axis L2. Subject light transmitted through the finder window 241, the liquid crystal shutter 243, the objective lens 245 and the prism 246 is led to the eyepiece part 242 by the eyepiece lens 247. As a result, the optical image of the photographic subject is visually recognized from the eyepiece part 242. That is, the finder window 241, the liquid crystal shutter 243, the objective lens 245, the prism 246, the eyepiece lens 247, and the eyepiece part 242 function as an optical finder (optical viewfinder).

The finder variable magnification lens 244 is provided freely movably in parallel between a position at which the lens is withdrawn from the optical axis L2 illustrated in FIG. 3 (withdrawn position) and a position at which the lens enters onto the optical axis L2 illustrated in FIG. 5 (entering position). When the state that the finder variable magnification lens 244 is withdrawn from the optical axis L2 illustrated in FIG. 3 is changed to the state that the finder variable magnification lens 244 enters onto the optical axis L2 illustrated in FIG. 5, the optical image observed from the eyepiece part 242 is enlarged.

The liquid crystal shutter 243 (light shielding device) is provided on a back surface of the finder window 241 so as to be vertical to the optical axis of the subject light made incident from the finder window 241. The liquid crystal shutter 243 is a liquid crystal panel which has a liquid crystal layer sealed between a pair of substrates and for which a polarizing direction is changed by a voltage applied to the liquid crystal layer. The liquid crystal shutter 243 is the liquid crystal panel having a resolution of 1,600×900 pixels for instance, and is configured so as to switch, for each pixel, between a light shielding state of shielding the subject light made incident from the finder window 241 as illustrated in FIG. 4 and a transmitting state (light non-shielding state) of transmitting the subject light by control of a finder switching control part 239 (see FIG. 6).

The liquid crystal plate 248 (display part) is a liquid crystal panel having a display resolution of 1,600×900 pixels which is the same as the resolution of the liquid crystal shutter 243 in this example. On the liquid crystal plate 248, by control of a display control part 210 (see FIG. 6), a frame indicating a photographing range which is a range of the subject light made incident on a light receiving surface of an imaging element 202 is displayed on the basis of a focal distance (angle of view) of the interchangeable lens 300. Also, on the liquid crystal plate 248, by the control of the display control part 210 (see FIG. 6), a captured image of the photographic subject can be inverted and displayed.

An image displayed on the liquid crystal plate 248 is transmitted through the lens 249 for the liquid crystal plate provided on an optical axis L3 and made incident on the prism 246 (image superimposing device).

The prism 246 is constituted of a first prism 246a and a second prism 246b, and at a part where the first prism 246a and the second prism 246b are joined, a half mirror surface 246M is formed. The half mirror surface 246M is tilted at 45 degrees to the optical axis L3 of the lens 249 for the liquid crystal plate and installed. The image displayed on the liquid crystal plate 248 is enlarged by the lens 249 for the liquid crystal plate, laterally inverted and reflected in a right direction in the figure by the half mirror surface 246M. The image (erect normal image) reflected by the half mirror surface 246M is transmitted through the eyepiece lens 247 and led to the eyepiece part 242.

Figure 6:
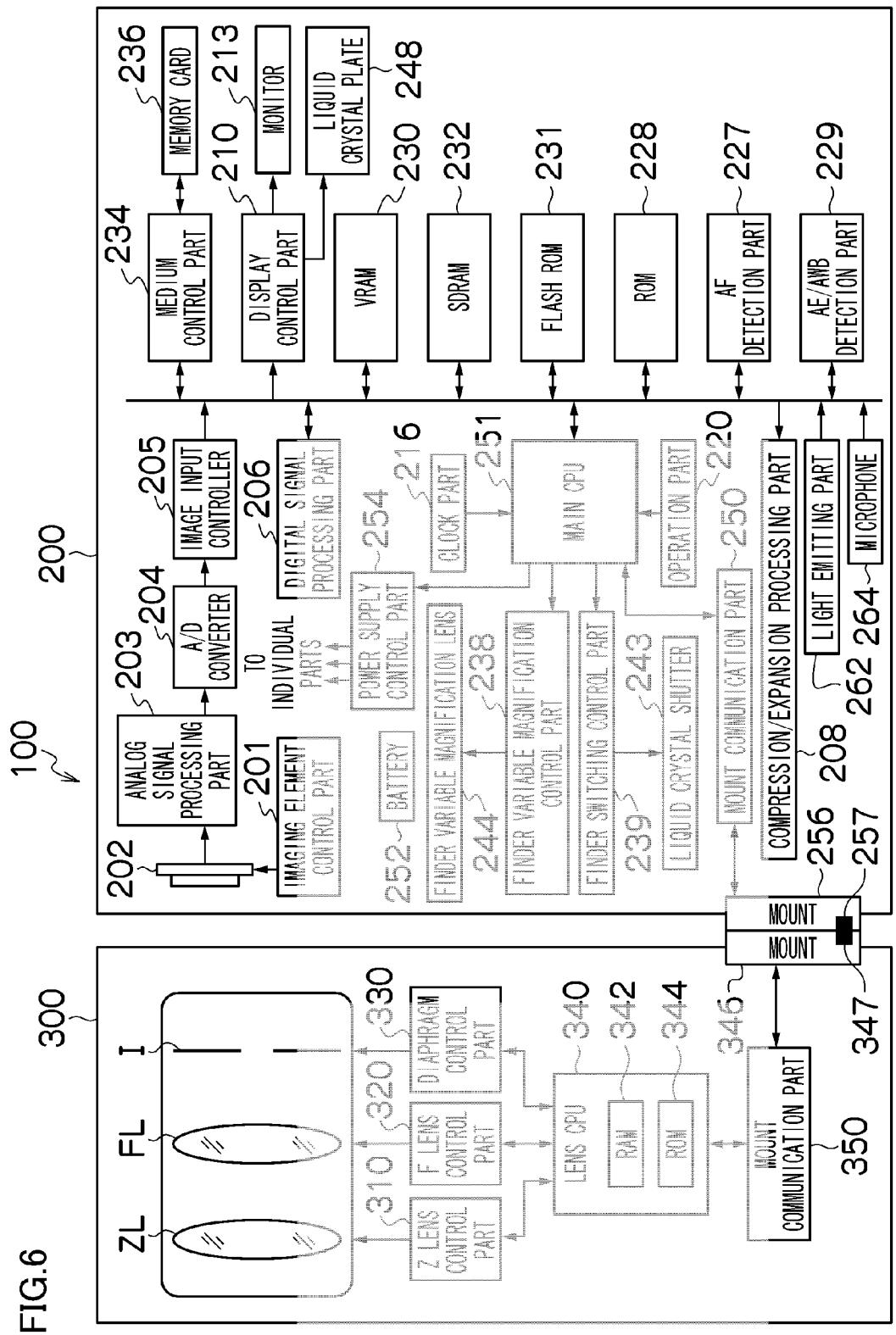
FIG. 6 is a block diagram illustrating a main section configuration of the imaging device 100.

FIG. 6 is a block diagram illustrating a configuration of the imaging device 100. An operation of the imaging device 100 is integrally controlled by a main CPU 251 of the camera body 200 and a lens CPU 340 of the interchangeable lens 300.

The main CPU 251 develops a camera control program stored in a flash ROM 226 in an SDRAM 232, and executes various kinds of processing while using the SDRAM 232 as a work memory. Also, the lens CPU 340 develops the camera control program stored in a ROM 344 in a RAM 342, and executes various kinds of processing while using the RAM 342 as a work memory. The SDRAM 232 is utilized as an area for arithmetic work of the main CPU 251, and is also utilized as a temporary storage area of image data. A control program to be executed by the main CPU 251, various kinds of data needed for control, and the like are stored in the flash ROM 231, and various kinds of setting information related to the operation of the digital camera such as user setting information and the like are stored.

When an operation part 220 including the MENU/OK key 222, the cross key 221, the BACK key 223 and the like is operated by a user, a signal from the operation part 220 is inputted to the main CPU 251, and the main CPU 251 controls individual circuits of the camera body 200 on the basis of the input signal, and also transmits and receives a signal to/from the interchangeable lens 300 through the mount 256 and a mount communication part 250 as described later.

The mount 256 is provided with a terminal 257, the mount 346 is provided with a terminal 347, and when the interchangeable lens 300 is mounted on the camera body 200, the corresponding terminal 257 and terminal 347 are brought into contact and communication becomes possible (positions and numbers of the terminal 257 and the terminal 347 in the present invention are not limited). Between the camera body 200 and the interchangeable lens 300, a drive command, various kinds of control statuses (lens drive start/completion notice or the like), setting information of the lens, and the like are communicated. The above-described terminals include, for instance, a terminal for grounding, a terminal for a synchronizing signal, a terminal for serial communication, a terminal for control status communication, and a terminal for power supply from a battery 252 of the camera body 200 to individual parts of the interchangeable lens 300.

The interchangeable lens 300 is mainly constituted of a zoom lens ZL, a focus lens FL, a diaphragm I, the lens CPU 340 and the like.

The zoom lens ZL and the focus lens FL are moved back and forth on the same optical axis to perform zooming and focusing. The zoom lens ZL is driven by a zoom lens control part 310 and the focal distance is changed. The main CPU 251 changes the focal distance by moving the zoom lens ZL inside the interchangeable lens 300 according to an operation of a zoom lever performed by the user. The focus lens FL is driven by a focus lens control part 320.

The diaphragm I controls a light quantity made incident on the imaging element 202, and controls exposure together with a shutter speed. The diaphragm I is, for instance, composed of five diaphragm blades, and diaphragm-controlled in six stages from a diaphragm value F1.4 to F11 at the interval of 1 AV. The diaphragm I is driven by a diaphragm control part 330, and an opening amount is adjusted.

The lens CPU 340 determines a moving amount of the zoom lens ZL and the focus lens FL on the basis of current positions in an optical axis direction of the zoom lens ZL and the focus lens FL detected by a position sensor (not shown in the figure), lens target positions, and a lens adjustment EEPROM value in the setting information of the interchangeable lens 300, which is developed in the RAM 342 from the ROM 344.

The zoom lens control part 310 varies a photographing magnification by moving the zoom lens ZL in the optical axis direction according to a command from the lens CPU 340.

Also, the focus lens control part 320 moves the focus lens FL back and forth along the optical axis direction to focus on the photographic subject according to a command from the lens CPU 340. The diaphragm control part 330 changes the diaphragm value of the diaphragm I according to a command from the lens CPU 340.

The imaging element 202 is arranged in a post stage of the zoom lens ZL, the focus lens FL and the diaphragm I, and receives the subject light transmitted through the zoom lens ZL, the focus lens FL and the diaphragm I. The imaging element 202 is provided with a light receiving surface where many light receiving elements are arrayed in a matrix shape. The subject light transmitted through the zoom lens ZL, the focus lens FL and the diaphragm I is image-formed on the light receiving surface of the imaging element 202 and converted to an electric signal by the individual light receiving elements. As the imaging element 202, various photoelectric conversion element such as a CMOS or a CCD can be used.

The imaging element 202 (photographing device) outputs electric charges stored in the individual pixels as serial image signals line by line in synchronization with a vertical transfer clock and a horizontal transfer clock supplied from an imaging element control part 201. The main CPU 251 controls the imaging element control part 201 and controls the drive of the imaging element 202.

Charge storage time of the individual pixels (exposure time) is determined by an electronic shutter drive signal given from the imaging element control part 201. The main CPU 251 instructs the charge storage time to the imaging element control part 201.

Also, output of the image signal is started when the imaging device 100 is set to a photographing mode. That is, when the imaging device 100 is set to the photographing mode, in order to display a through image (live-view image) on the monitor 213, the output of the image signal is started. The output of the image signal for the through image is tentatively stopped when main photographing is instructed, and is started again when the main photographing is ended.

The image signal outputted from the imaging element 202 in this example is an analog signal, and the analog image signal is fetched to an analog signal processing part 203 (photographing device).

The analog signal processing part 203 (photographing device) is configured including a correlated double sampling circuit (CDS), and an automatic gain control circuit (AGC). The CDS eliminates noise included in the image signal, and the AGC amplifies the image signal from which the noise is eliminated. The analog image signal to which signal processing is conducted in the analog signal processing part 203 is fetched to an A/D converter 204.

In the case that the A/D converter is provided inside the imaging element 202, a digital signal is outputted from the imaging element 202, and a device for processing the digital signal is provided instead of the analog signal processing part 203.

The A/D converter 204 converts the fetched analog image signal to a digital image signal having a gradation width of prescribed bits. The image signal is so-called RAW data, and has a gradation value indicating densities of R, G and B of each pixel.

An image input controller 205 (photographing device) incorporates a line buffer of a prescribed capacity, and stores the image signals for one frame outputted from the A/D converter 204. The image signals for one frame that are stored in the image input controller 205 are stored in the SDRAM 232.

The image signals for one frame that are stored in the SDRAM 232 are fetched to a digital signal processing part 206 (photographing device) in a point sequential manner (in the order of the pixels).

The digital signal processing part 206 executes signal processing to the point-sequentially fetched image signals of individual colors R, G and B, and generates the image signals (Y/C signals) composed of luminance signals Y and color difference signals Cr and Cb.

An AF detection part 227, according to a command of the main CPU 251, fetches the image signals of R, G and B that are stored in the SDRAM 232, and calculates a focus evaluation value required for AF (Automatic Focus) control. The AF detection part 227 includes a high-pass filter that makes only high frequency components of G signals pass through, an absolute value generation processing part, an AF area extraction part that segments the signals inside a focus area (called an AF area, hereinafter) set on the screen, and an integration part that integrates absolute value data inside the AF area, and outputs the absolute value data inside the AF area, that is integrated in the integration part, to the main CPU 251 as the focus evaluation value. As a control system of the focus lens FL based on the focus evaluation value, a system of searching a position at which the focus evaluation value becomes maximum and moving the focus lens FL to the position and a mountain climbing system of moving the focus lens FL in a direction in which the focus evaluation value increases, and when a point where the focus evaluation value starts to decrease is detected, setting a focus lens group at the position can be used. Also, a phase difference system of separately disposing an imaging element for phase difference AF using a phase difference and performing AF using the phase difference detected by the imaging element for the phase difference AF may be used.

An AE/AWB detection part 229 fetches the image signals of R, G and B that are stored in the SDRAM 232, integrates the G signals of the entire screen or integrates the G signals weighted differently at a screen center part and a peripheral part, and outputs an integrated value required for the AE control to the main CPU 251. The main CPU 251 calculates a luminance value from the integrated value, and obtains an exposure value from the luminance value. Also, the diaphragm value and a shutter speed are determined according to a program diagram from the exposure value.

Also, the AE/AWB detection part 229, as a physical quantity required for AWB control, divides one screen into a plurality of areas (16×16, for instance), and calculates an average integrated value for each color of the image signals of R, G and B for each of the divided areas. The main CPU 251 obtains ratios of R/G and B/G for each of the divided areas from the integrated value of R, the integrated value of B and the integrated value of G that are obtained, and discriminates a light source kind on the basis of a distribution in a color space of R/G and B/G of the obtained values of R/G and B/G or the like. Then, according to a white balance adjustment value suitable for the discriminated light source kind, a gain value (white balance correction value) for the R, G and B signals of a white balance adjustment circuit is determined such that values of the individual ratios become roughly 1 (that is, an integration ratio of RGB on one screen is R:G: B=1:1:1) for instance. The AE/AWB detection part 229 adjusts white balance by multiplying the image signals for one frame that are stored in the SDRAM 232 by a digital gain according to the light source kind, also performs gamma (gradation characteristic) processing and sharpness processing, and generates the R, G and B signals.

A compression/expansion processing part 208 generates compressed image data by executing compression processing to image data generated in the digital signal processing part 206 according to a command from the main CPU 251. Also, expansion processing is executed to the compressed image data to generate non-compressed image data.

A medium control part 234, according to a command from the main CPU 251, records the image data obtained by photographing in a memory card 236, and reads recorded images from the memory card 236. Also, the memory card 236 is not limited to an attachable and detachable storage medium and may be a storage medium incorporated in the imaging device 100.

The display control part 210 (display control device) controls display to the monitor 213 and the liquid crystal plate 248 according to a command from the main CPU 251.

The finder variable magnification control part 238 (finder variable magnification control device) changes the optical magnification (OVF magnification) of an OVF optical system (first finder optical system) of the finder 240 by driving the finder variable magnification lens 244 of the finder 240 and inserting and removing the finder variable magnification lens 244 onto/from the optical axis L2.

The finder switching control part 239 (finder switching control device) switches between an OVF state and an EVF state of the finder 240. That is, the finder switching control part 239 switches between the state of leading the optical image of the photographic subject to the eyepiece part 242 of the finder 240 through the OVF optical system (first finder optical system) of the finder 240 (OVF state), and the state of displaying the captured image of the photographic subject on the liquid crystal plate 248 (display part) of the finder 240 and leading the captured image of the photographic subject to the eyepiece part 242 of the finder 240 through the EVF optical system (second finder optical system) (EVF state).

Description of Example of Operation Device

Figure 7:
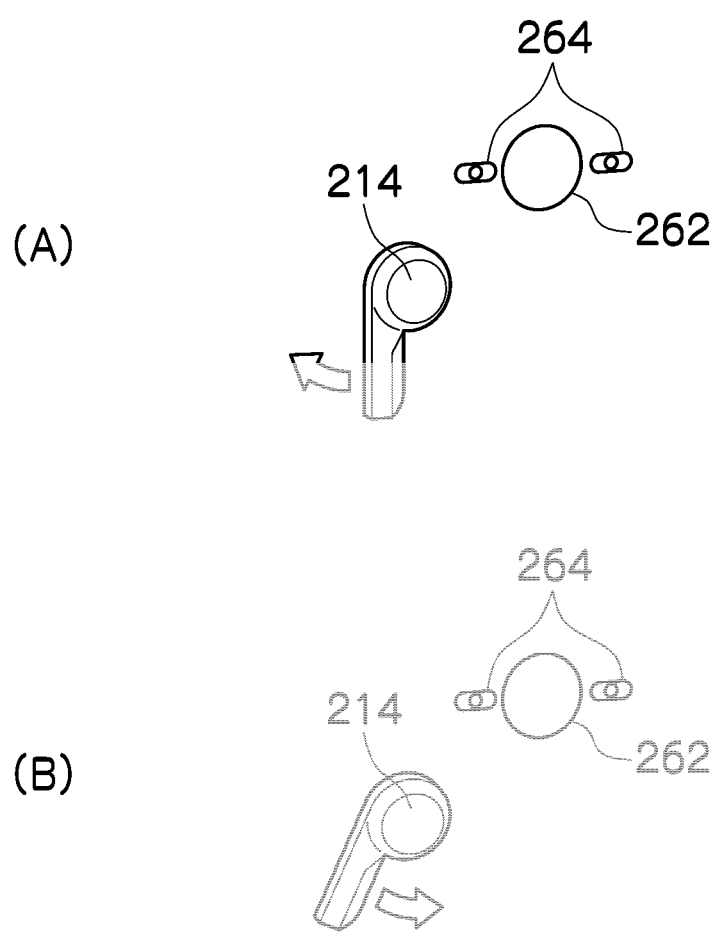
FIG. 7 is an explanatory drawing illustrating the state that a finder operation lever 214 as one example of an operation device that can be operated with a finger is at a first position in the (A) portion, and is an explanatory drawing illustrating the state that the finder operation lever is at a second position in the (B) portion.

FIGS. 7(A) and (B) are explanatory drawings of the finder operation lever 214 which is one example of the operation device that can be operated with a finger. FIG. 7(A) illustrates the state that the finder operation lever 214 is positioned at a default position (first position), and FIG. 7(B) illustrates the state that the finder operation lever 214 is positioned at an instruction position for receiving an instruction (second position).

The finder operation lever 214 is moved on the same track between the default position and the instruction position by both of the first operation (finder switching operation) and the second operation (finder magnification varying operation) with a finger. That is, in this example, the entire finder operation lever 214 is a movable part, and the finder operation lever 214 can be turned with a finger from the default position to the instruction position as illustrated by an arrow in FIG. 7(A). Also, when the finger is released from the finder operation lever 214 positioned at the instruction position, the lever returns from the instruction position to the default position as illustrated by an arrow in FIG. 7(B). The finder operation lever 214 in this example is urged to return from the instruction position to the default position.

The case of providing a turning operation member for which a turning operation can be performed with a finger on the camera body 200 is described, however, the present invention is not limited to such a case. For instance, a slide operation member for which a sliding operation can be performed with a finger may be provided on the camera body 200 as the operation device for the finder operation.

Also, on the front surface facing the photographic subject of the camera body 200, the light emitting part 262 and the microphone 264 are arranged around the finder operation lever 214, and the finder operation lever 214 is turned (moved) in a direction of separating from the position of the light emitting part 262 and the microphone 264 on the front surface of the camera body 200 by the first operation (finder switching operation) and the second operation (finder magnification varying operation).

Also, as illustrated in FIG. 1, the release button 211 (photographing instruction input part) that receives the input of the photographing instruction is arranged on an upper surface of the camera body 200, and the finder operation lever 214 is arranged at a position so as to be operated, while the release button 211 is touched with a pointing finger of a right hand, with a middle finger of the same right hand as the pointing finger touching the release button 211. Also, a holding part 270 to be held with the right hand is formed on the camera body 200, and the finder operation lever 214 is provided on a position so as to be operated with the finger of the right hand holding the holding part 270.

As finder operations by the finder operation lever 214, there are two kinds that are the finder switching operation (first operation) and the finder magnification varying operation (second operation).

When the finder operation lever 214 is operated, the main CPU 251 determines which of the finder switching operation and the finder magnification varying operation the kind of the operation is, and controls the finder according to the determination result.

Also, there are various kinds of forms for determination of whether it is the finder switching operation or the finder magnification varying operation (operation kind determination). For instance, there is a form of determining the operation kind on the basis of a length of the time during which the finder operation lever 214 is continuously positioned at the instruction position. Also, there is a form of determining the operation kind on the basis of the number of times that the finder operation lever 214 is repeatedly positioned at the instruction position at a time interval shorter than a fixed time interval.

Description of Example of Finder Switching Control

An outline of a finder switching control example is described. In the case that the finder switching operation (first operation) is performed by the finder operation lever 214, the main CPU 251 executes control of switching the finder 240 between the OVF (optical viewfinder) state and the EVF (electronic viewfinder) state by the finder switching control part 239. In the OVF state, as illustrated in FIG. 3, the optical image of the photographic subject made incident on the finder window 241 is led to the eyepiece part 242 through the liquid crystal shutter 243 in the light non-shielding state, the objective lens 245, the prism 246 and the eyepiece lens 247 along the optical axis L2. Also, in the EVF state, as illustrated in FIG. 4, the liquid crystal shutter 243 is set to the light shielding state, and the captured image of the photographic subject that is displayed on the liquid crystal plate 248 reaches the prism 246 through the lens 249 for the liquid crystal plate along the optical axis L3, is reflected by the half mirror surface 246M of the prism 246, and is led to the eyepiece part 242 through the eyepiece lens 247 along the optical axis L2.

Description of Example of Finder Variable Magnification Control

A finder variable magnification control example is described. In the case that the finder magnification varying operation (second operation) is performed by the finder operation lever 214 in the OVF (optical viewfinder) state that the optical image of the photographic subject is led to the eyepiece part 242 of the finder 240, the main CPU 251 executes control of switching the optical magnification (OVF magnification) of the finder 240 by the finder variable magnification control part 238. That is, the finder variable magnification control part 238 is made to change the magnification of the OVF optical system (first finder optical system) of the finder 240. In this example, the OVF magnification is switched by switching between the state of withdrawing the finder variable magnification lens 244 from the optical axis L2 of the OVF optical system as illustrated in FIG. 3 and the state of making the lens enter onto the optical axis L2 of the OVF optical system as illustrated in FIG. 5.

Also, in the case that the finder magnification varying operation (second operation) is performed by the finder operation lever 214 in the EVF (electronic viewfinder) state that the captured image of the photographic subject is led to the eyepiece part 242 of the finder 240, the main CPU 251 changes the electronic magnification of the captured image of the photographic subject displayed on the liquid crystal plate 248 of the finder 240 by the display control part 210. That is, the display control part 210 is made to change the magnification of the EVF optical system (second finder optical system) of the finder 240.

Figure 8:
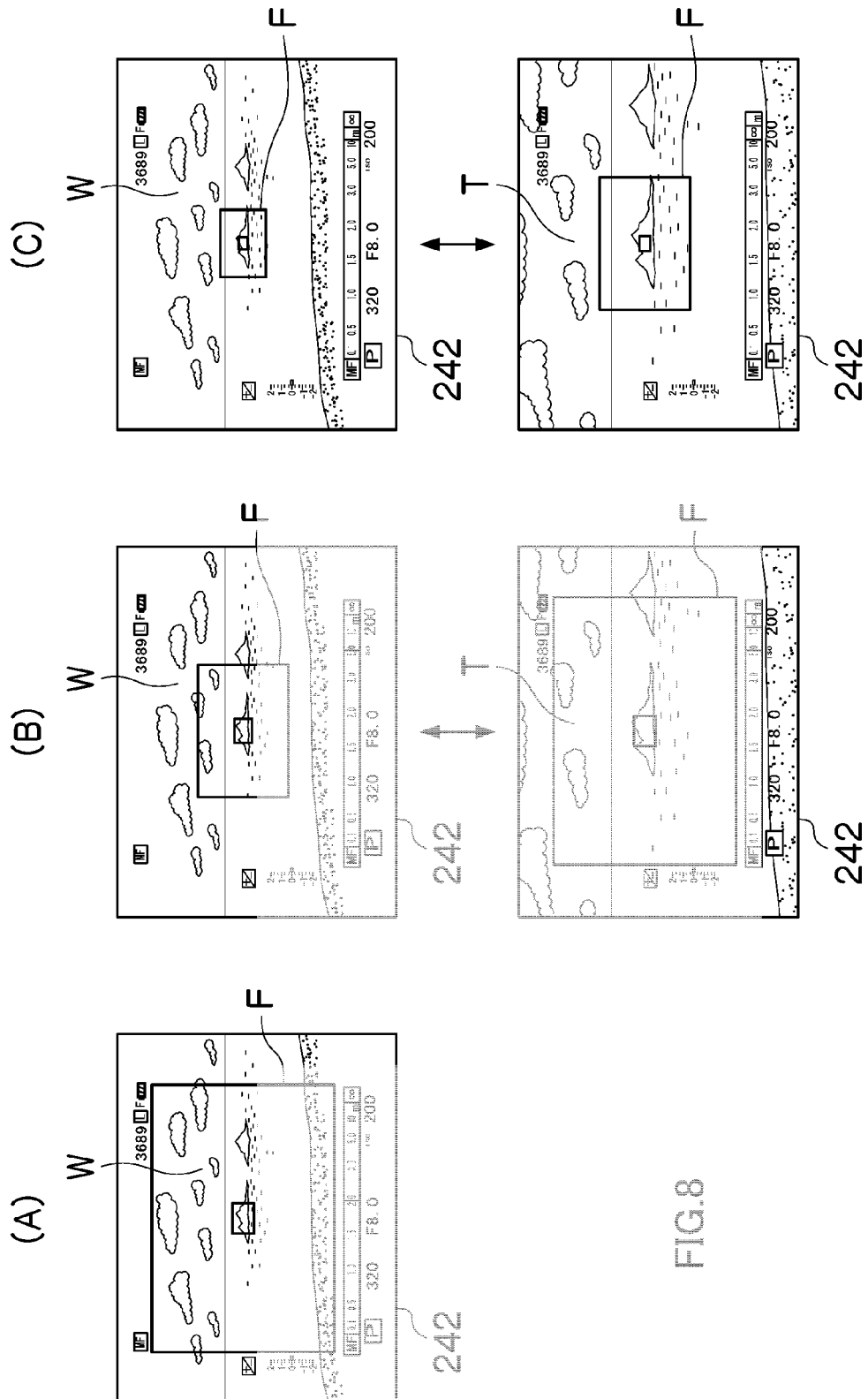
FIG. 8 illustrates an example of an optical image when an interchangeable lens of a first focal distance is mounted as shown in the (A) portion, illustrates an example of an optical image when an interchangeable lens of a second focal distance longer than the first focal distance is mounted as shown in the (B) portion, and illustrates an example of an optical image when an interchangeable lens of a third focal distance longer than the second focal distance is mounted as shown in the (C) portion.

FIGS. 8(A)-(C) are explanatory drawings of variable magnification control of the OVF (optical viewfinder). The optical image observed at the eyepiece part 242 in the case that the focal distance of the interchangeable lens 300 is a first focal distance (18 mm in this example) is illustrated in FIG. 8(A). Also, the optical image observed at the eyepiece part 242 in the case that the focal distance of the interchangeable lens 300 is a second focal distance (35 mm in this example) longer than the first focal distance is illustrated in FIG. 8(B). Also, the optical image observed at the eyepiece part 242 in the case that the focal distance of the interchangeable lens 300 is a third focal distance (60 mm in this example) longer than the second focal distance is illustrated in FIG. 8(C).

The main CPU 251 of the present embodiment has a first OVF variable magnification control function of acquiring information on the interchangeable lens 300 (for instance, information related to the focal distance) from the interchangeable lens 300 by the mount communication parts 250, 350 and changing the magnification of the OVF optical system according to the focal distance of the interchangeable lens 300, and a second OVF variable magnification control function of changing the magnification of the OVF optical system according to the finder magnification varying operation (second operation) by the finder operation lever 214.

The first OVF variable magnification control function according to the information on the interchangeable lens 300 is described first.

In the case that the focal distance of the interchangeable lens 300 is the first focal distance (18 mm in this example), the finder variable magnification control part 238 sets the finder variable magnification lens 244 at the position at which the lens is withdrawn from the optical path L2 (withdrawn position) as illustrated in FIG. 3. Then, at the eyepiece part 242 of the finder 240, a wide-angle optical image W illustrated in FIG. 8(A) is observed. Also, in order to superimpose an image F of the frame indicating the photographing range on the optical image W, the image F of the frame is displayed on the liquid crystal plate 248 of the finder 240 by the display control part 210.

In the case that the focal distance of the interchangeable lens 300 is the second focal distance (35 mm in this example), if the finder variable magnification lens 244 is set at the withdrawn position, the frame F indicating the photographing range becomes small compared to the case of the first focal distance. Then, the finder variable magnification lens 244 is set at the position at which the lens enters onto the optical path L2 (entering position) as illustrated in FIG. 5. Then, at the eyepiece part 242 of the finder 240, a telescopic optical image T illustrated in a lower stage of FIG. 8(B) is observed. That is, the frame F can be turned to the almost same size as that when the interchangeable lens 300 of the first focal distance is mounted.

In the case that the focal distance of the interchangeable lens 300 is the third focal distance (60 mm in this example), if the finder variable magnification lens 244 is set at the withdrawn position, the frame F indicating the photographing range becomes considerably small compared to the case of the first focal distance. Then, the finder variable magnification lens 244 is set at the entering position as illustrated in FIG. 5. Then, at the eyepiece part 242 of the finder 240, the telescopic optical image T illustrated in a lower stage of FIG. 8(C) is observed. That is, the frame F can be turned to the almost same size as that when the interchangeable lens 300 of the second focal distance is mounted and the finder variable magnification lens 244 is set at the withdrawn position.

Next, the second OVF variable magnification control to be performed according to the operation of the finder operation lever 214 is described.

In the case that the interchangeable lens 300 of the second focal distance (35 mm in this example) is mounted, when the finder variable magnification lens 244 is set at the entering position according to the focal distance of the interchangeable lens 300 as described above, the telescopic optical image T illustrated in the lower stage of FIG. 8(B) is observed at the eyepiece part 242 of the finder 240. Here, when the finder magnification varying operation (second operation) is performed by the finder operation lever 214 trying to observe the outer side of the frame F, the finder variable magnification lens 244 is moved to the withdrawn position as illustrated in FIG. 3, and the wide-angle optical image W illustrated in the upper stage of FIG. 8(B) is observed at the eyepiece part 242 of the finder 240. When the finder magnification varying operation is performed by the finder operation lever 214 again, the telescopic optical image T illustrated in the lower stage of FIG. 8(B) is observed at the eyepiece part 242 of the finder 240.

In the case that the interchangeable lens 300 of the third focal distance (60 mm in this example) is mounted, when the finder variable magnification lens 244 is set at the entering position according to the focal distance of the interchangeable lens 300 as described above, the telescopic optical image T illustrated in the lower stage of FIG. 8(C) is observed at the eyepiece part 242 of the finder 240. Here, when the finder magnification varying operation (second operation) is performed by the finder operation lever 214, the finder variable magnification lens 244 is moved to the withdrawn position as illustrated in FIG. 3, and the wide-angle optical image W illustrated in the upper stage of FIG. 8(C) is observed at the eyepiece part 242 of the finder 240. When the finder magnification varying operation is performed by the finder operation lever 214 again, the telescopic optical image T illustrated in the lower stage of FIG. 8(C) is observed at the eyepiece part 242 of the finder 240.

Also, in this example, in the case that the interchangeable lens 300 of the first focal distance is mounted, even when the finder magnification varying operation is performed by the finder operation lever 214, the magnification of the OVF is not enlarged. It is because that, when an optical image 31 is enlarged, the photographing range is turned to the outer side of the eyepiece part 242 of the finder 240. However, the present invention is not limited to such a case, and the OVF magnification may be enlarged by the finder magnification varying operation for an operator who wants to enlarge and observe the optical image of the photographic subject.

The withdrawn position and the entering position of the finder variable magnification lens 244 are described by FIG. 3 and FIG. 5 in order to facilitate understanding, however, in the imaging device 100 illustrated in FIG. 1, actually, the finder variable magnification lens 244 is moved in a direction orthogonal to both of the optical axis L2 and the optical axis L3 (lateral direction) as illustrated in FIGS. 9(A) and (B).

Finder Operation of First Example

Figure 10:
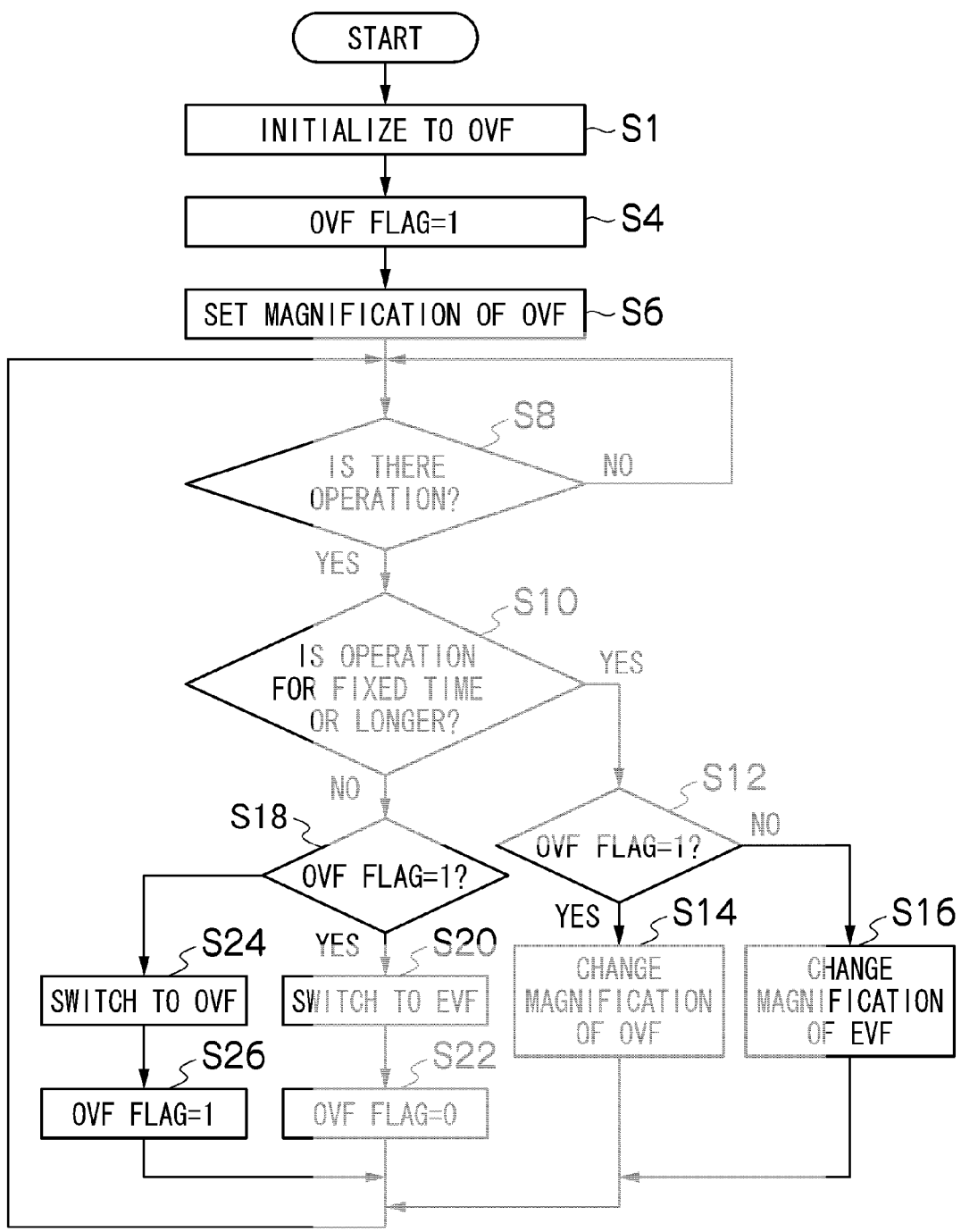
FIG. 10 is a flowchart illustrating a flow of finder control processing corresponding to a lever operation of a first example.

FIG. 10 is a flowchart illustrating a flow of finder control processing corresponding to a lever operation of a first example. This processing is executed according to a program by the main CPU 251 of the camera body 200.

First, the finder 240 is initialized to the OVF (optical viewfinder) state (step S2), an OVF flag is set at "1" (OVF) (step S4), and the optical magnification (OVF magnification) of the finder 240 is automatically set on the basis of the focal distance of the interchangeable lens 300 (step S6). In this example, the finder variable magnification lens 244 is set at the entering position in the case that the focal distance of the interchangeable lens 300 is equal to or longer than a prescribed value (30 mm in this example), and the finder variable magnification lens 244 is set at the withdrawn position in the case that the focal distance of the interchangeable lens 300 is shorter than the prescribed value.

Whether or not the finder operation lever 214 is operated is determined (step S8), and in the case that the operation is performed, whether or not the finder operation lever 214 is operated for the fixed time or longer is determined (step S10). That is, the finder operation lever 214 is moved from the default position (first position) to the instruction position (second position), and it is determined as the finder magnification varying operation in the case that the time during which the finder operation lever 214 is continuously positioned at the instruction position (second position) is the fixed time (2 seconds for instance) or longer, and it is determined as the finder switching operation in the case that the time is shorter than the fixed time (2 seconds for instance).

In the case that the finder operation lever 214 is operated for the fixed time or longer (Yes in step S10), whether or not the OVF flag is "1" is determined (step S12). That is, whether or not the finder 240 is in the OVF (optical viewfinder) state is determined. The optical magnification of the finder 240 is changed by moving the finder variable magnification lens 244 back and forth relative to the optical path L2 by the finder variable magnification control part 238 (step S14) in the case that the OVF flag is "1", and the electronic magnification (EVF magnification) of the finder 240 is changed by the display control part 210 (step S16) in the case that the OVF flag is "0".

In the case that the finder operation lever 214 is operated shorter than the fixed time (No in step S10), whether or not the OVF flag is "1" (OVF) is determined (step S18). In the case that the OVF flag is "1" (OVF), the finder 240 is switched from the OVF state to the EVF state (step S20), and the OVF flag is set to "0" (EVF) (step S22). In the case that the OVF flag is "0", the finder 240 is switched from the EVF state to the OVF state (step S24), and the OVF flag is set to "1" (OVF) (step S26).

Finder Operation of Second Example

Figure 11:
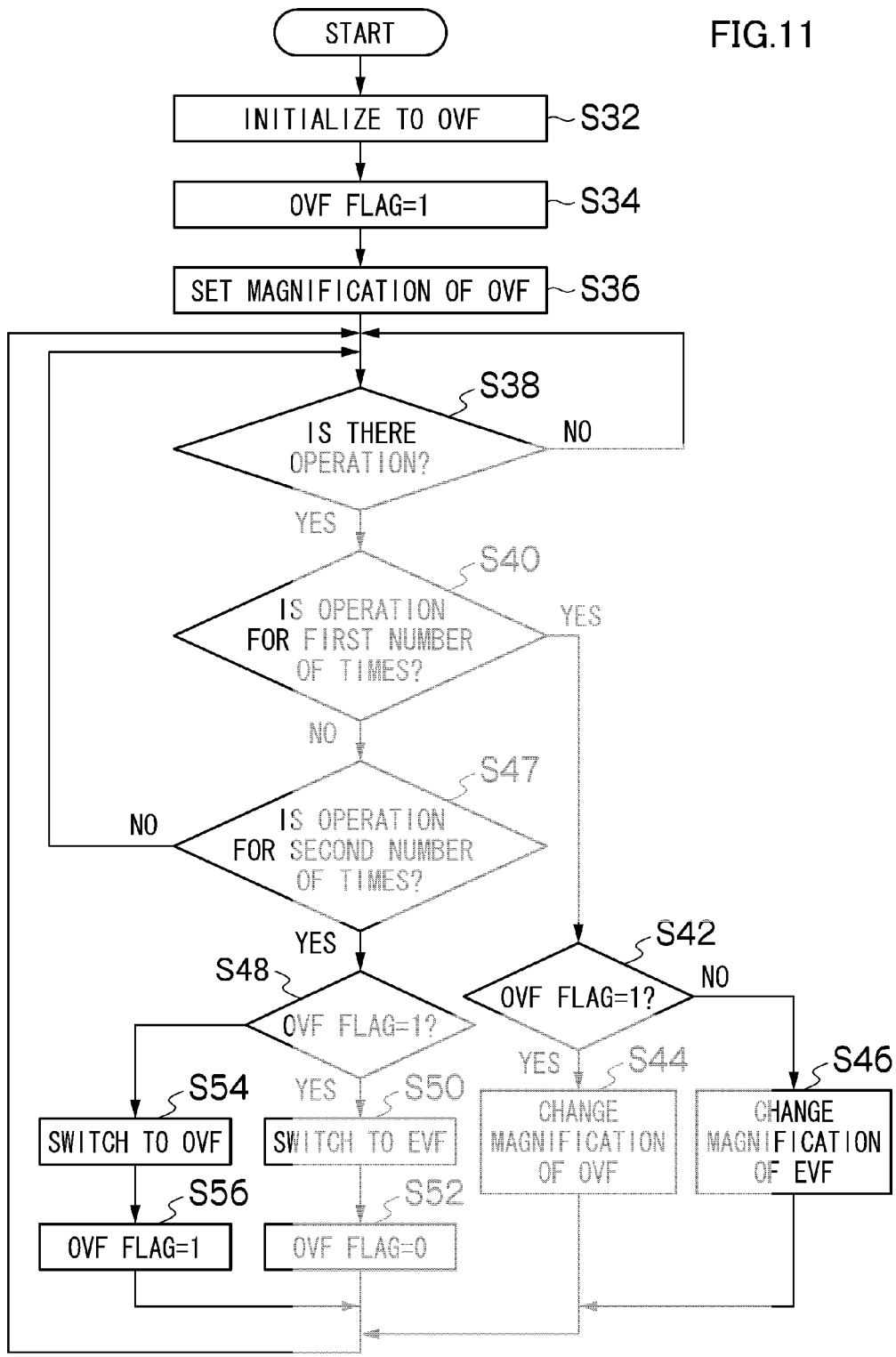
FIG. 11 is a flowchart illustrating a flow of finder control processing corresponding to a lever operation of a second example.

FIG. 11 is a flowchart illustrating a flow of finder control processing corresponding to the operation of the second example. This processing is executed according to the program by the main CPU 251 of the camera body 200.

Steps S32-S36 are similar to steps S2-S6 of the first example illustrated in FIG. 10, and descriptions are omitted.

Whether or not the finder operation lever 214 is operated is determined (step S38), and in the case that the operation is performed, whether or not the finder operation lever 214 is operated for a first number of times is determined (step S40). That is, whether or not the operation of repeatedly positioning the finder operation lever 214 at the second position at a time interval shorter than a fixed time interval (1 second for instance) is performed for the first number of times (1 time for instance) is determined. In the case that the finder operation lever 214 is operated for the first number of times, whether or not the OVF flag is "1" is determined (step S42), the optical magnification of the finder 240 is changed by moving the finder variable magnification lens 244 back and forth relative to the optical path L2 by the finder variable magnification control part 239 (step S44) in the case that the OVF flag is "1", and the electronic magnification (EVF magnification) of the finder 240 is changed by the display control part 210 (step S46) in the case that the OVF flag is "0".

Also, whether or not the finder operation lever 214 is operated for a second number of times is determined (step S47). That is, whether or not the operation of repeatedly positioning the finder operation lever 214 at the second position at the time interval shorter than the fixed time interval (1 second for instance) is performed for the second number of times (2 times for instance) is determined. In the case that the finder operation lever 214 is operated for the second number of times, in the case that the operation of the finder operation lever 214 is performed for the second number of times, whether or not the OVF flag is "1" is determined (step S48), and in the case that the OVF flag is "1", the finder 240 is switched from the OVF state to the EVF state (step S50), and the OVF flag is set to "0" (EVF) (step S52). In the case that the OVF flag is "0", the finder 240 is switched from the EVF state to the OVF state (step S54), and the OVF flag is set to "1" (OVF) (step S56).

Finder Control Processing Example when Power is on

Figure 12:
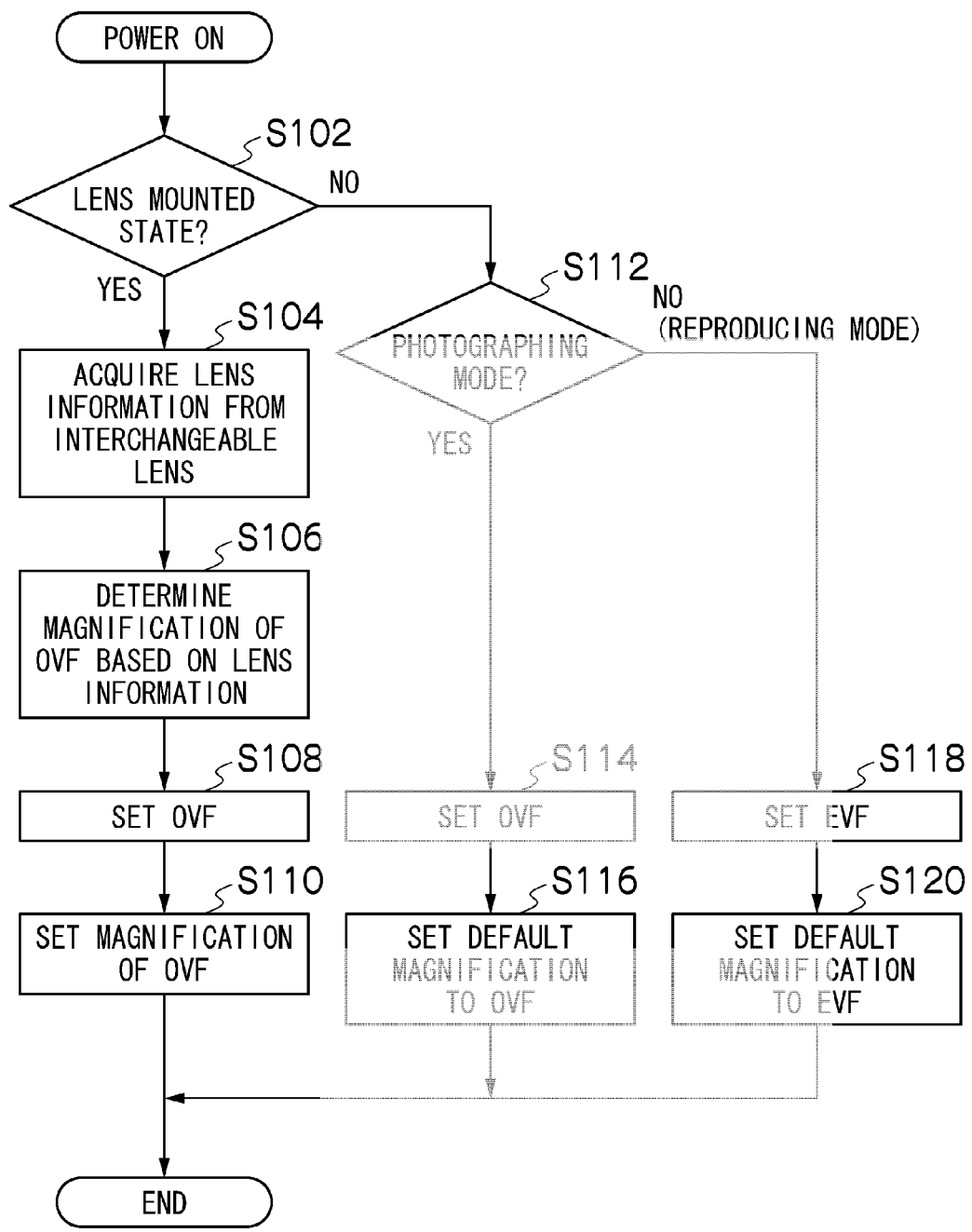

FIG. 12 is a flowchart illustrating a flow of finder control processing when power of the imaging device 100 is on. This processing is executed according to the program by the main CPU 251 of the camera body.

By the mount communication part 250 (mounting detection device and lens information acquisition device), whether or not the interchangeable lens 300 is mounted on the mount 256 is detected (step S102).

In the case that the interchangeable lens 300 is mounted (Yes in step S102), the lens information is acquired from the interchangeable lens 300 by the mount communication part 250 (mounting detection device and lens information acquisition device) (step S104), and the OVF magnification of the finder 240 is determined on the basis of the acquired lens information (step S106).

For instance, the lens information including the information indicating the focal distance of the interchangeable lens 300 is acquired from the interchangeable lens 300, and the OVF magnification is determined on the basis of the acquired focal distance. The lens information including the information indicating a type of the interchangeable lens 300 (lens type information) may be acquired and the OVF magnification may be determined on the basis of the acquired lens type information.

The finder 240 is set to the OVF state by the finder switching control part 239 (step S108), and the OVF magnification determined in step S106 is set to the finder 240 by the finder variable magnification control part 238 (step S110).

In the case that the interchangeable lens is not mounted (No in step S102), whether the imaging device 100 is set to the photographing mode or is set to the reproducing mode is determined (step S112). The photographing mode is the mode of imaging the photographic subject and recording the captured image of the photographic subject in the memory card 236 as one example of a recording medium. The reproducing mode is the mode of reproducing and displaying the captured image of the photographic subject that is recorded in the memory card 236 on the monitor 213. In the case that the photographing mode is set (Yes in step S112), the finder 240 is set to the OVF state by the finder switching control part 239 (step S114), and a default OVF magnification is set to the finder 240 by the finder variable magnification control part 238 (step S116). In the case that the reproducing mode is set (No in step S112), the finder 240 is set to the EVF state by the finder switching control part 239 (step S118), and a default EVF magnification is set to the finder 240 by the finder variable magnification control part 238 (step S120).

Figure 13:
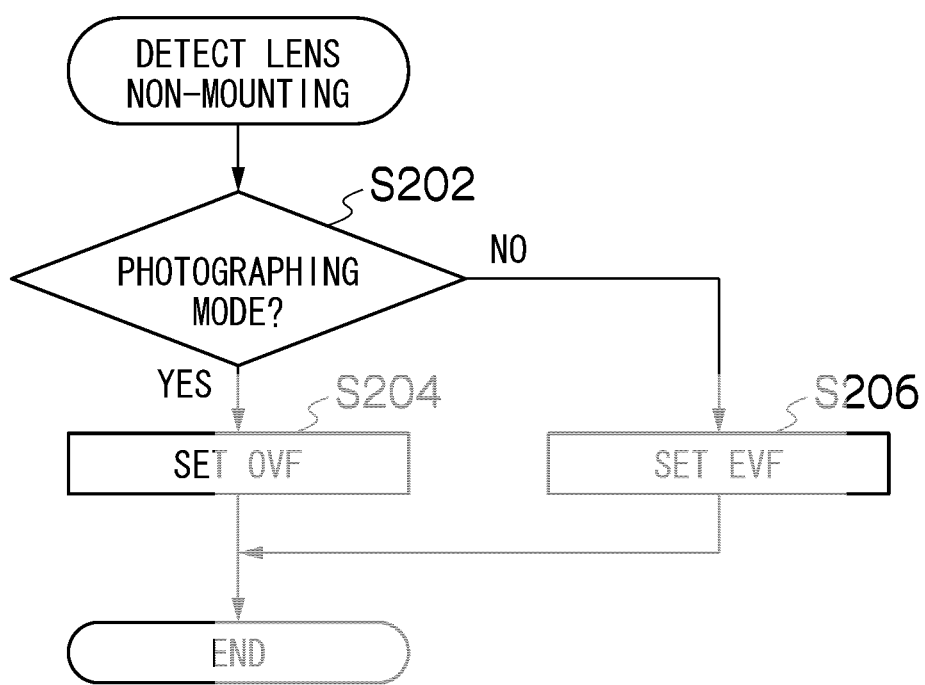
FIG. 13 is a flowchart illustrating a flow of finder control processing when non-mounting of an interchangeable lens 300 is detected.

Finder Control Processing Example when Non-Mounting of Interchangeable Lens is Detected FIG. 13 is a flowchart illustrating a flow of finder control processing when non-mounting of an interchangeable lens 300 is detected. This processing is executed according to the program by the main CPU 251 of the camera body.

When non-mounting of the interchangeable lens 300 is detected by the mount communication part 250 (mounting detection device and lens information acquisition device), whether the imaging device 100 is in the photographing mode of recording the captured image of the photographic subject in the memory card 236 as one example of the recording medium or in the reproducing mode of reproducing and displaying the captured image of the photographic subject recorded in the memory card 236 on the monitor 213 is determined (step S202).

In the case of the photographing mode, by the finder switching control part 239, the finder 240 is set to the OVF state (step S204). That is, by turning off interruption of the subject light by the liquid crystal shutter 243, the optical image of the photographic subject made incident from the finder window 241 is led to the eyepiece part 242 through the objective lens 245 and the eyepiece lens 247. Also, by the display control part 210, the display of the captured image of the photographic subject on the liquid crystal plate 248 of the finder 240 is turned off.

In the case of the reproducing mode, by the finder switching control part 239, the finder 240 is set to the EVF state (step S206). That is, the subject light made incident from the finder window 241 is interrupted by the liquid crystal shutter 243 so that the optical image of the photographic subject made incident from the finder window 241 does not reach the eyepiece part 242. Also, by the display control part 210, the display of the captured image of the photographic subject on the liquid crystal plate 248 of the finder 240 is turned on.

Finder Control Processing Example when an Operation Device is Operated

Figure 14:
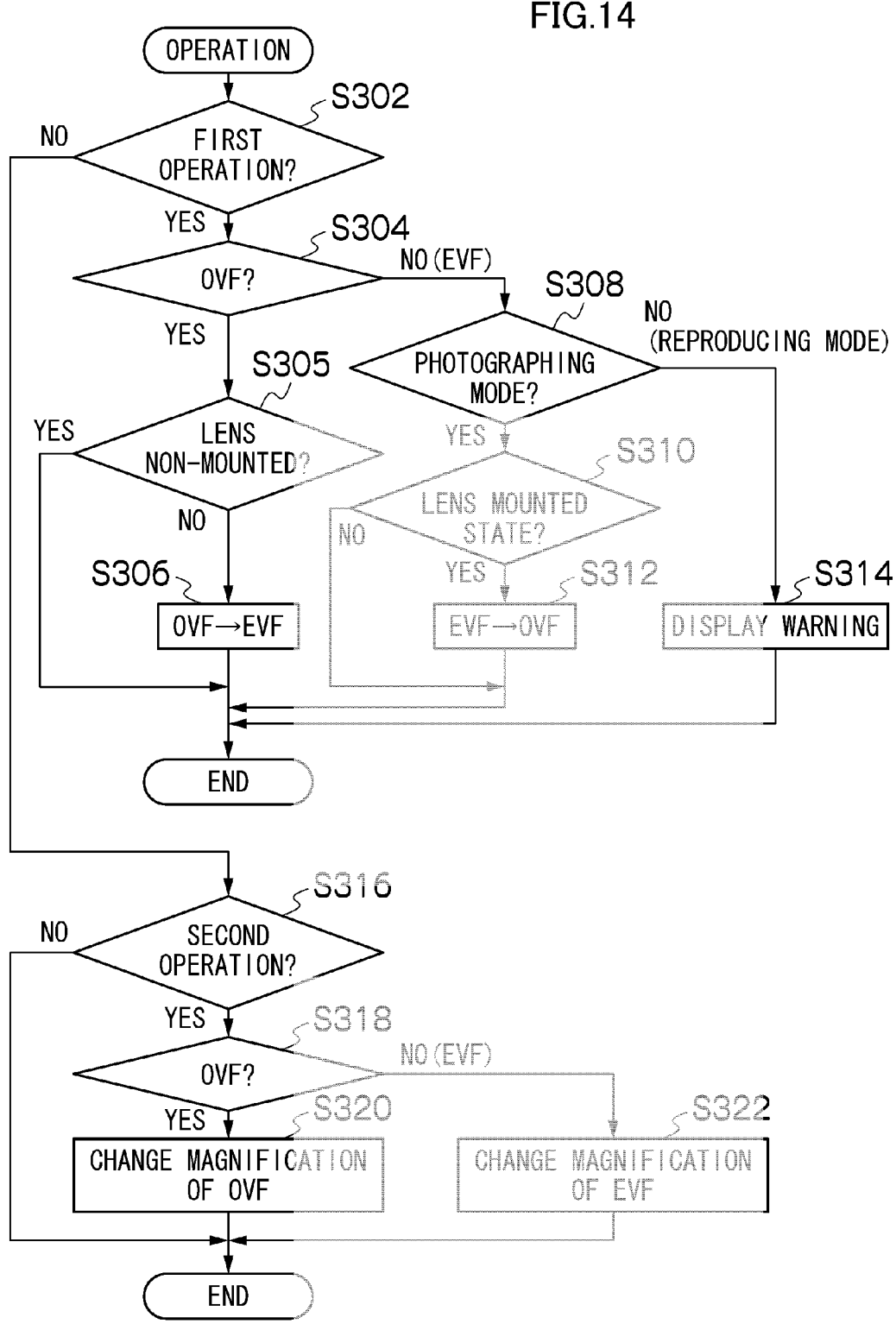
FIG. 14 is a flowchart illustrating a flow of finder control processing example when a finder operation lever of the imaging device 100 is operated.

FIG. 14 is a flowchart illustrating a flow of finder control processing example when the finder operation lever 214 of the imaging device 100 is operated. This processing is executed according to the program by the main CPU 251 of the camera body.

First, whether or not the operation of the finder operation lever 214 is the finder switching operation (first operation) is determined (step S302).

In the case of the finder switching operation (first operation), which of the OVF and EVF states the finder 240 is in is determined (step S304), whether the interchangeable lens 300 is mounted or is not mounted is determined in the case that the finder 240 is in the OVF state (step S305), and in the case that the interchangeable lens 300 is mounted (in the case of No in step S305), the finder 240 is switched from the OVF state to the EVF state by the finder switching control part 239 (step S306). In the case that the interchangeable lens 300 is not mounted (in the case of Yes in step S305), even when the first operation is performed, the OVF state is maintained. Also, in the case that the finder switching operation (first operation) is performed in the state that the imaging lens is not mounted, it is preferable that the main CPU 251 makes the liquid crystal plate 248 (display part) of the finder 240 display the information indicating that the captured image of the photographic subject cannot be displayed, thereby superimposing the information displayed on the liquid crystal plate 248 of the finder 240 on the optical image of the photographic subject through the EVF optical system (second finder optical system) of the finder. In the case that the finder 240 is in the EVF state, whether it is the photographing mode or the reproducing mode is determined (step S308), whether or not the interchangeable lens 300 is mounted is determined further in the case of the photographing mode (step S310), and in the case that the interchangeable lens 300 is mounted, the finder 240 is switched from the EVF state to the OVF state by the finder switching control part 239 (step S312). In the case of the reproducing mode, even when the finder switching operation (first operation) is performed, by displaying warning information (such as a mark or a message) on the liquid crystal plate 248 by the display control part 210, the warning information is superimposed and displayed on the optical image of the photographic subject at the eyepiece part 242 (step S314).

Also, whether or not the operation of the finder operation lever 214 is the finder magnification varying operation (second operation) is determined (step S316).

In the case of the finder magnification varying operation (second operation), which of the OVF and EVF states the finder 240 is in is determined (step S318). In the case of the OVF state, the OVF magnification of the finder 240 is changed by the finder variable magnification control part 239 (step S320). In the case of the EVF state, the EVF magnification of the finder 240 is changed (step S322).

Finder Control Processing Example when an Operation Device is Operated

Figure 15:
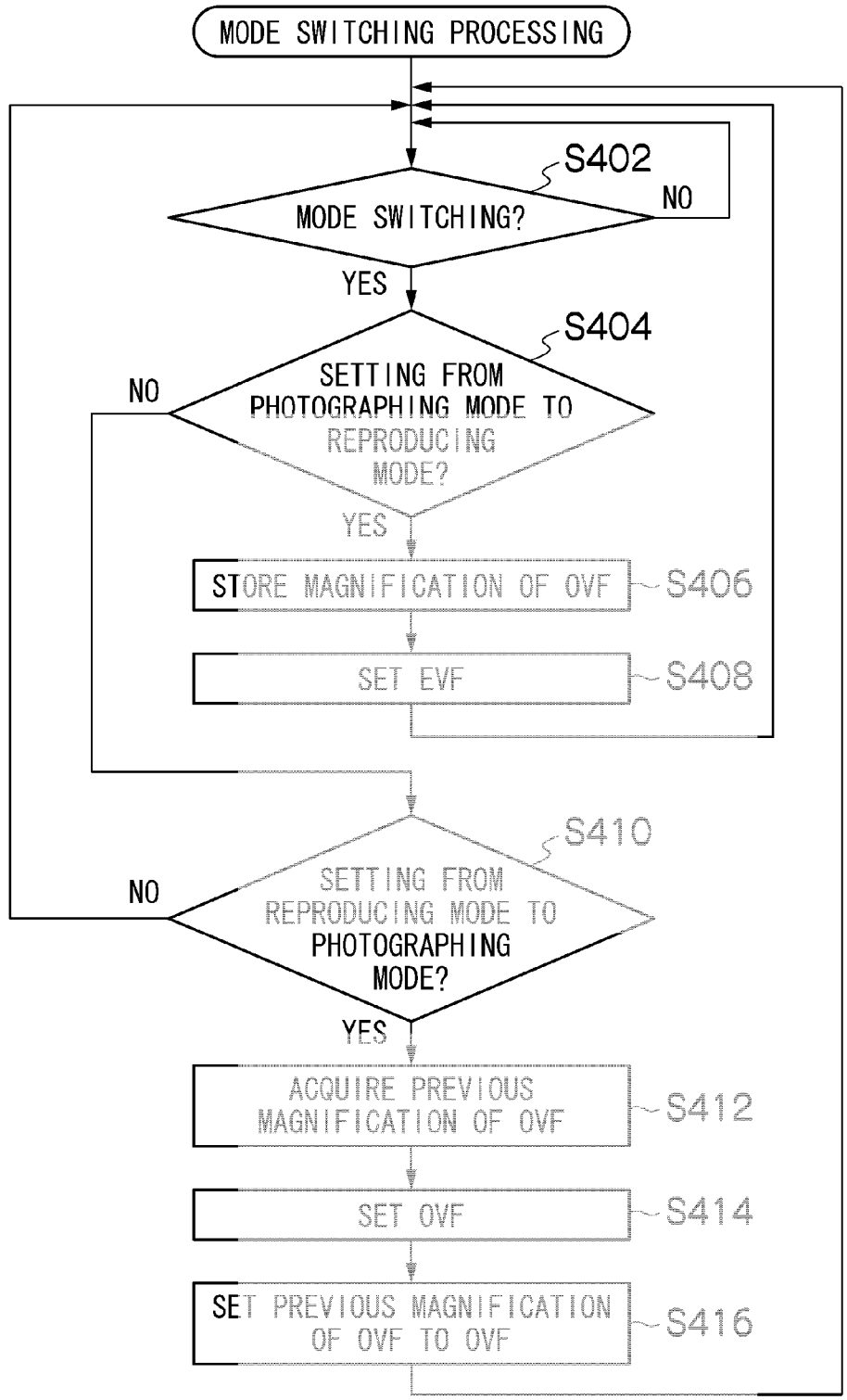
FIG. 15 is a flowchart illustrating a flow of finder control processing during mode switching processing example of the imaging device 100.

FIG. 15 is a flowchart illustrating a flow of finder control processing during mode switching processing example of the imaging device 100. This processing is executed according to the program by the main CPU 251 of the camera body.

First, whether or not it is mode switching is determined (step S402), and in the case of mode switching, whether or not the photographing mode is to be switched to the reproducing mode is determined (step S404).

In the case of switching from the photographing mode to the reproducing mode (Yes in step S404), the OVF magnification of the finder 240 is stored in the SDRAM 232 (step S406), and the finder 240 is set to the EVF state by the finder switching control part 239 (step S408).

Also, whether or not the reproducing mode is to be switched to the photographing mode is determined (step S410). In the case of switching from the reproducing mode to the photographing mode, the OVF magnification set to the finder 240 during the previous photographing mode is acquired from the SDRAM 232, and the acquired OVF magnification is set to the OVF optical system of the finder 240. That is, the OVF magnification that is set to the finder 240 during the previous photographing mode, which is the OVF magnification acquired from the SDRAM 232, is set to the finder 240 by the finder variable magnification control part 238.

As described above, the main CPU 251 (control device) sets the magnification of the OVF optical system (first finder optical system) of the finder 240 to the magnification according to the focal distance of the interchangeable lens 300 on the basis of the lens information acquired from the interchangeable lens 300 (imaging lens) when the power of the imaging device 100 is on, and in the case that the photographing mode returns from the reproducing mode, sets the magnification of the OVF optical system (first finder optical system) of the finder 240 to the magnification set in the photographing mode before the return. That is, while the optical magnification (the magnification of the first finder optical system) of the finder 240 can be a default value suitable for the interchangeable lens 300 since a photographing condition is often changed from the time of previous photographing when the power is turned on, it is preferable that the optical magnification of the finder 240 is automatically switched to the same magnification as that for the time of the previous photographing for the user since the photographing condition is often the same as the time of the previous photographing when the photographing mode returns from the reproducing mode.

Also, the main CPU 251 (control device) has a function of switching from the photographing mode to a power saving sleep mode, and in the case that the photographing mode returns from the sleep mode, sets the optical magnification of the OVF optical system (first finder optical system) to the magnification set in the photographing mode before the return. That is, while the optical magnification of the finder 240 can be generally the default value suitable for the interchangeable lens 300 since the photographing condition is often changed from the time of the previous photographing when the power is turned on, it is preferable that the optical magnification of the finder 240 is automatically switched to the same magnification as that for the time of the previous photographing for the user since the photographing condition is often the same as the time of the previous photographing when the photographing mode returns from the sleep mode.

[Variation of Operation Device]

The imaging device 100 illustrated in FIG. 1 is described taking as an example the case of providing the finder operation lever 214 composed of a member for which a turning operation can be performed with a finger (finger turning operation member) as the operation device used for both of the finder switching operation and the finder magnification varying operation, however, the present invention is not limited to such a case.

Figure 16:
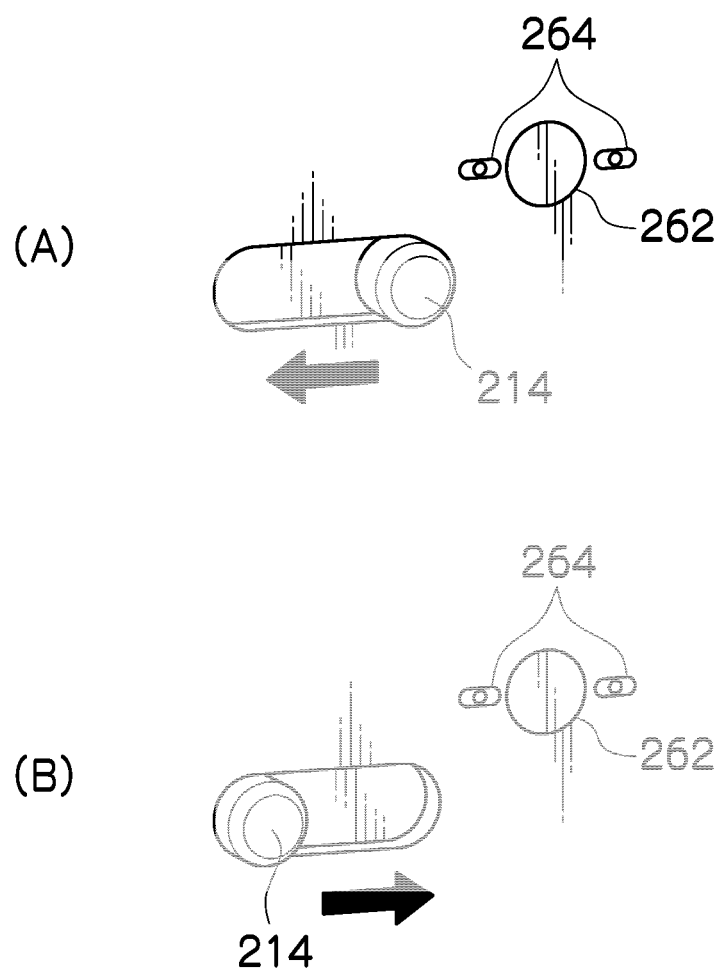
FIG. 16 is an explanatory drawing of the case that a finder operation lever composed of a slide operation member is provided on a front surface of a camera body 200.

FIG. 16 illustrates the case that the finder operation lever 214*a* composed of a member for which a slide operation can be performed with a finger (finger slide operation member) is provided on the front surface of the camera body 200, as the finder operation lever 214.

In FIG. 16, the finder operation lever 214*a*, the light emitting part 262, and the microphone 264 are arranged on the front surface facing the photographic subject of the imaging device 100. The finder operation lever 214a is moved in a direction of separating from the position of the light emitting part 262 by the operations (finder switching operation and finder magnification varying operation) with a finger. When the finger is released from the finder operation lever 214a, the finder operation lever 214a returns to an original position (default position).

[Variation of OVF Variable Magnification]

Figure 9:
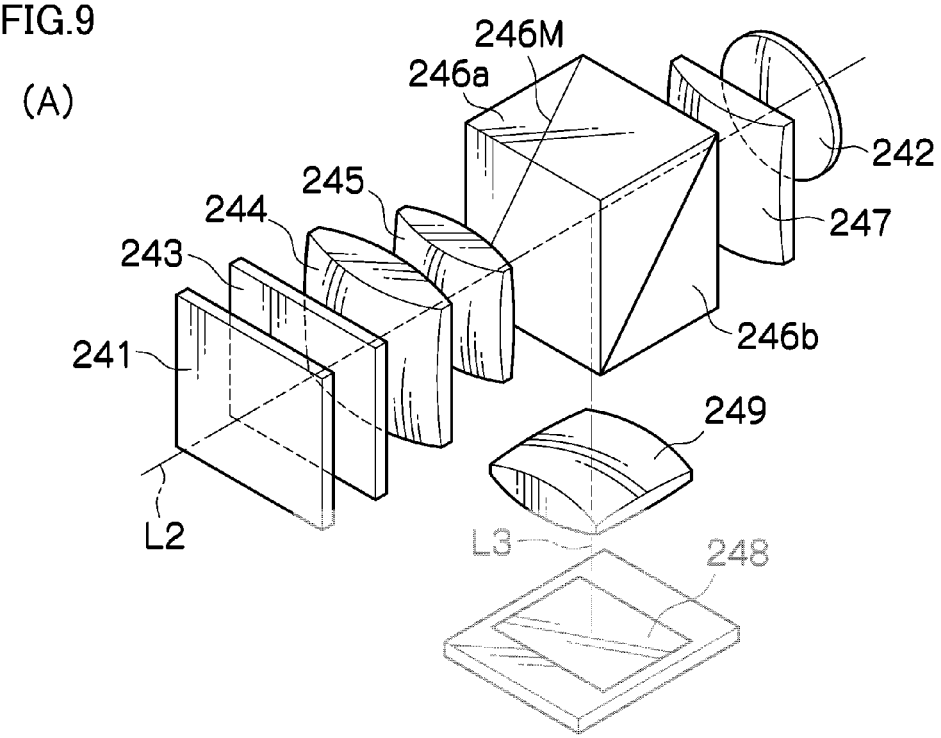
FIG. 9 is a perspective view illustrating the state that a finder variable magnification lens 244 is made to enter the optical path L2 as show in the (A) portion, and is a perspective view illustrating the state that the finder variable magnification lens 244 is withdrawn from the optical path L2 as show in the (B) portion.
Figure 9:
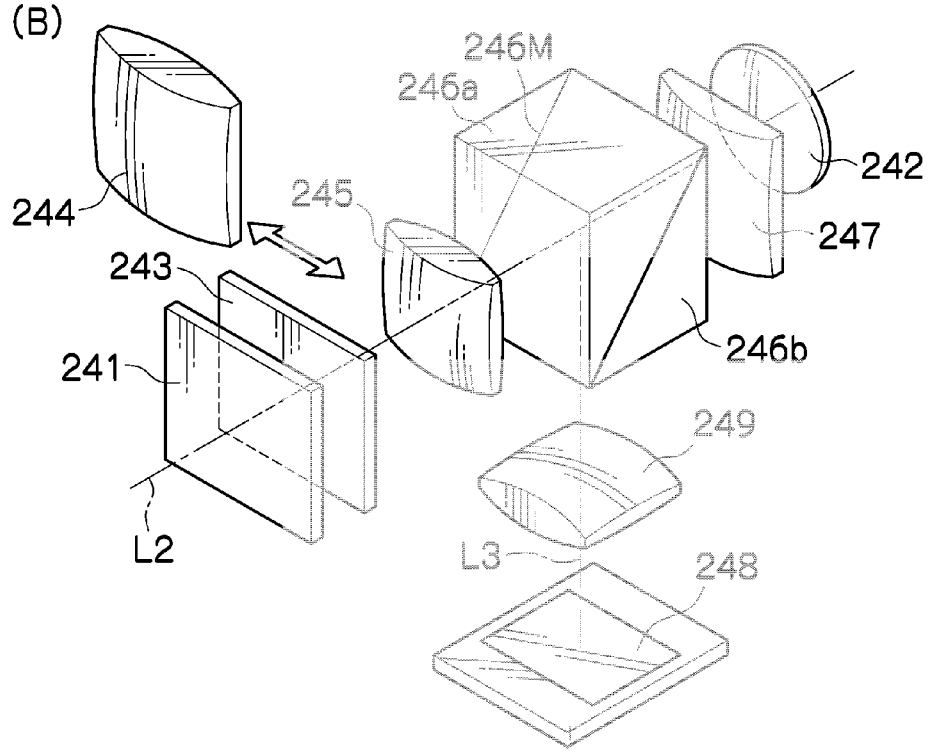

The finder 240 illustrated in FIG. 9 is configured to switch the OVF magnification by moving one finder variable magnification lens 244 back and forth relative to the optical path L2 of the OVF optical system, however, the present invention is not limited to such a case.

The configuration may be such that the OVF magnification is switched in a plurality of stages by moving the plurality of finder variable magnification lenses 244 back and forth relative to the optical path L2 of the OVF optical system.

Also, the finder 240 may be provided with a variable magnification lens to be moved along the optical path L2 of the OVF optical system (first finder optical system), and the OVF magnification may be changed by the variable magnification lens.

The present invention is not limited by the examples described in this description or the examples illustrated in the drawings, and of course various kinds of design changes and improvements can be made without departing from the scope of the present invention.

What is claimed is:

1. An imaging device comprising:
    an imaging element that images a photographic subject through an imaging lens;
    a finder including an eyepiece part, a first finder optical system that leads an optical image of the photographic subject to the eyepiece part through a route different from the imaging lens, a display part that can display a captured image of the photographic subject obtained by performing imaging in the imaging element, and a second finder optical system that leads the captured image of the photographic subject displayed at the display part to the eyepiece part;
    an operation device that can be operated with a finger;
    a finder switching control device that switches between leading of the optical image of the photographic subject through the first finder optical system of the finder to the eyepiece part of the finder, and display of the captured image of the photographic subject at the display part of the finder and leading of the captured image of the photographic subject through the second finder optical system of the finder to the eyepiece part of the finder;
    a finder variable magnification control device that changes a magnification of the first finder optical system of the finder; and
    a control device that switches between leading of the optical image of the photographic subject and leading of the captured image of the photographic subject to the eyepiece part of the finder by the finder switching control device when a first operation is performed by the operation device, and makes the finder variable magnification control device change the magnification of the first finder optical system of the finder when a second operation different from the first operation is performed by the operation device in an optical viewfinder state in which the optical image of the photographic subject is led to the eyepiece part of the finder.

2. The imaging device according to claim 1, comprising:
    a lens mounting part to/from which the imaging lens is attachable and detachable;
    a mounting detection device that detects whether or not the imaging lens is mounted on the lens mounting part; and
    a lens information acquisition device that acquires information on the imaging lens from the imaging lens when mounting of the imaging lens is detected by the mounting detection device,
    wherein the control device sets the magnification of the first finder optical system of the finder by the finder variable magnification control device on the basis of the information on the imaging lens, which is acquired from the imaging lens by the lens information acquisition device.

3. The imaging device according to claim 1,
    wherein the control device changes the magnification of the captured image of the photographic subject displayed at the display part of the finder when the second operation is performed by the operation device in an electronic viewfinder state in which the captured image of the photographic subject is led to the eyepiece part of the finder.

4. The imaging device according to claim 2,
    wherein there are a photographing mode of recording the captured image of the photographic subject in a recording medium, and a reproducing mode of reproducing and displaying the captured image of the photographic subject, which is recorded in the recording medium, and
    wherein the control device sets the magnification of the first finder optical system of the finder at a magnification according to a focal distance of the imaging lens on the basis of the information on the imaging lens, which is acquired from the imaging lens, when power of the imaging device is turned on, and sets the magnification of the first finder optical system of the finder at the magnification set in the photographing mode before return when the photographing mode returns from the reproducing mode.

5. The imaging device according to claim 4,
    wherein the control device has a function of switching from the photographing mode to a power saving sleep mode, and when the photographing mode returns from the sleep mode, sets the magnification of the first finder optical system of the finder at the magnification set in the photographing mode before the return.

6. The imaging device according to claim 2,
    wherein there are a photographing mode of recording the captured image of the photographic subject in a recording medium, and a reproducing mode of reproducing and displaying the captured image of the photographic subject, which is recorded in the recording medium, and
    wherein, when non-mounting of the imaging lens is detected in the photographing mode, the control device sets the finder to the optical viewfinder state, and keeps the optical viewfinder state even when the first operation is performed in the operation device.

7. The imaging device according to claim 6,
    wherein, when the first operation is performed in the state that the non-mounting of the imaging lens is detected, the control device makes the display part of the finder display information indicating that the captured image of the photographic subject cannot be displayed, thereby superimposing the information displayed at the display part of the finder on the optical image of the photographic subject through the second finder optical system of the finder.

8. The imaging device according to claim 1,
wherein the operation device includes a movable part that moves on the same track between a first position and a second position different from the first position by both of the first operation and the second operation.

9. The imaging device according to claim 8,
wherein the movable part of the operation device is configured to move from the first position to the second position accompanying the operation and return from the second position to the first position when the operation is stopped, and
wherein the control device determines whether it is the first operation or the second operation on the basis of a length of the time during which the movable part of the operation device is positioned at the second position.

10. The imaging device according to claim 8,
wherein the movable part of the operation device is configured to move from the first position to the second position accompanying the operation and return from the second position to the first position when the operation is stopped, and
wherein the control device determines that it is the first operation when an operation of repeatedly positioning the movable part of the operation device at the second position at a time interval shorter than a prescribed time interval is performed for a first number of times, and determines that it is the second operation when the operation of repeatedly positioning the operation device at the second position at the time interval shorter than the prescribed time interval is performed for a number of times different from the first number of times.

11. The imaging device according to claim 1,
wherein the operation device and a light emitting part are arranged on a surface facing the photographic subject, and
wherein the operation device is moved in a direction of separating from a position of the light emitting part by the first operation and the second operation.

12. The imaging device according to claim 1,
wherein the operation device and a microphone are arranged on the surface facing the photographic subject, and
wherein the operation device is moved in a direction of separating from a position of the microphone by the first operation and the second operation.

13. The imaging device according to claim 1, comprising
a photographing instruction input part that receives input of a photographing instruction,
wherein the movable part of the operation device is arranged at such a position that, while the photographing instruction input part is being touched with a pointing finger, the movable part of the operation device can be operated with a middle finger of the same hand as the pointing finger.

14. The imaging device according to claim 1, comprising
a holding part to be held with one hand,
wherein the operation device is provided at a position so as to be operated with a finger of the hand holding the holding part.

15. An imaging method that
uses an imaging element that images a photographic subject through an imaging lens, a finder including an eyepiece part, a first finder optical system that leads an optical image of the photographic subject to the eyepiece part through a route different from the imaging lens, a display part that can display a captured image of the photographic subject obtained by performing imaging in the imaging element, and a second finder optical system that leads the captured image of the photographic subject displayed at the display part to the eyepiece part, an operation device that can be operated with a finger, a finder switching control device that switches between leading of the optical image of the photographic subject through the first finder optical system of the finder to the eyepiece part of the finder, and display of the captured image of the photographic subject at the display part of the finder and leading of the captured image of the photographic subject through the second finder optical system of the finder to the eyepiece part of the finder, and a finder variable magnification control device that changes a magnification of the first finder optical system of the finder,
switches between leading of the optical image of the photographic subject and leading of the captured image of the photographic subject to the eyepiece part of the finder by the finder switching control device when a first operation is performed by the operation device, and makes the finder variable magnification control device change the magnification of the first finder optical system of the finder when a second operation different from the first operation is performed by the operation device in an optical viewfinder state in which the optical image of the photographic subject is led to the eyepiece part of the finder.

* * * * *